(12) United States Patent
Zushi et al.

(10) Patent No.: US 11,782,016 B2
(45) Date of Patent: Oct. 10, 2023

(54) GAS SENSOR

(71) Applicant: DENSO CORPORATION, Kariya (JP)

(72) Inventors: Junta Zushi, Kariya (JP); Makoto Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 15/977,204

(22) Filed: May 11, 2018

(65) Prior Publication Data

US 2018/0328880 A1 Nov. 15, 2018

(30) Foreign Application Priority Data

May 12, 2017 (JP) ................. 2017-095977

(51) Int. Cl.
*G01N 27/407* (2006.01)
(52) U.S. Cl.
CPC ..... *G01N 27/4076* (2013.01); *G01N 27/4071* (2013.01); *G01N 27/4075* (2013.01); *G01N 27/4077* (2013.01)
(58) Field of Classification Search
CPC .............. G01N 27/409; G01N 27/407; G01N 27/4075; G01N 27/4077
See application file for complete search history.

(56) References Cited

U.S. PATENT DOCUMENTS

| | | | |
|---|---|---|---|
| 4,773,376 A | 9/1988 | Uchikawa et al. | |
| 4,957,705 A | 9/1990 | Uchikawa | |
| 5,302,274 A * | 4/1994 | Tomantschger | ... G01N 27/4045 204/412 |
| 5,472,591 A | 12/1995 | Saito et al. | |
| 6,210,552 B1 | 4/2001 | Mizutani et al. | |
| 6,210,641 B1 | 4/2001 | Yamada et al. | |
| 7,713,393 B2 * | 5/2010 | Atsumi | ............. G01N 27/4075 204/429 |
| 2002/0060152 A1 | 5/2002 | Hotta et al. | |
| 2003/0061862 A1 | 4/2003 | Kondo et al. | |

(Continued)

FOREIGN PATENT DOCUMENTS

| | | |
|---|---|---|
| JP | 2-298857 | 12/1990 |
| JP | 2010-181241 | 8/2010 |
| JP | 2014-52327 | 3/2014 |

OTHER PUBLICATIONS

Definition of "specifric surface area" in Wikipedia. (Year: 2020).*

*Primary Examiner* — Caitlyn Mingyun Sun
(74) *Attorney, Agent, or Firm* — Nixon & Vanderhye P.C.

(57) ABSTRACT

A gas sensor which detects a concentration of a specific gas contained in a gas to be measured is provided with a gas sensor element. The gas sensor element has an ion conductive solid electrolyte body, a measuring gas electrode which is mounted on a surface of the solid electrolyte body, a reference gas electrode mounted on a surface of the solid electrolyte body, and a catalyst layer mounted on an outerside relative to the measuring gas electrode-side. The catalyst layer contains a metal catalyst loaded onto a carrier. The metal catalyst is a Pt single substance, and has a specific surface area defined by the equation below of equal to or more than 0.01 to equal to or less than 23: Specific surface area=total surface area of metal catalyst which exists on an electrode unit surface area/actual surface area of electrode per electrode unit surface area.

7 Claims, 15 Drawing Sheets

(56) References Cited

U.S. PATENT DOCUMENTS

| | | |
|---|---|---|
| 2007/0144905 A1 | 6/2007 | Tsuji et al. |
| 2007/0151851 A1 | 7/2007 | Tanaka et al. |
| 2009/0244120 A1 | 10/2009 | Yamazaki |
| 2010/0270154 A1 | 10/2010 | Suzuki et al. |
| 2010/0270155 A1 | 10/2010 | Suzuki et al. |
| 2010/0292935 A1 | 11/2010 | Wakamatsu et al. |
| 2011/0139619 A1 | 6/2011 | Ikeda et al. |
| 2012/0073356 A1 | 3/2012 | Nishijima et al. |
| 2012/0305397 A1 | 12/2012 | Imagawa |
| 2016/0169831 A1* | 6/2016 | Wang ................ G01N 27/4075 204/424 |
| 2016/0290953 A1 | 10/2016 | Sakimoto et al. |

\* cited by examiner

FIG.14 (AFTER BINARY TREATMENT)

GAS SENSOR

CROSS REFERENCE RELATED APPLICATION

This application is based on and claims the benefit of earlier Japanese Patent Application No. 2017-95977, filed on May 12, 2017, the description of which is incorporated herein by reference.

BACKGROUND OF THE INVENTION

Technical Field

The present disclosure relates to a gas sensor for an internal combustion engine, for example, for an automotive vehicle. In particular a gas sensor which is used to detect a concentration of a specific gas in a gas to be measured.

Related Art

Recently, vehicle manufacturers are looking to provide efficient exhaust gas systems for internal combustion engines of which exhaust gas emitted from the engine is within emission regulations. Exhaust gas systems which are employed for engines used in vehicles are each equipped with an exhaust gas purification system on the exhaust gas system. The exhaust gas purification system is equipped with a catalyst for purifying the exhaust gas and a gas sensor which detects an oxygen concentration, for example, contained in the exhaust gas. The exhaust gas system is configured to control a combustion state and a monitor a catalyst state based on a detected result of the oxygen concentration, for example. In this case, a three way catalyst is used as the catalyst in the exhaust gas system to efficiently purify CO (carbon monoxide), HC (hydrocarbons) and NOx (nitrogen oxides) which are released when fuel is combusted at a stoichiometric air-fuel ratio near to A/F=14.5, for example. An electromotive force-type gas sensor (that is an oxygen sensor) generally outputs a signal which corresponds to an oxygen concentration at a later stage, after the exhaust gas passes through the three way catalyst.

A process system post to purification of the exhaust gas monitors a composition of the exhaust gas after the gas passes through the three way catalyst, and controls an air/fuel ratio, such that, the three way catalyst purifies the exhaust gas in an optimum range thereof. The exhaust gas composition has surplus CO and HC when fuel is in a rich state of the stoichiometric air-fuel ratio and surplus NOx when the fuel is in a lean state thereof. For example, when the fuel is changed to either the rich state or the lean state, the composition of the exhaust gas is also changed, therefore, there is an increased demand for a gas sensor which can accurately detect the change thereof.

A gas sensor, which may be used for the purpose described above, is generally provided with a gas sensor element. The gas sensor element is equipped with a solid electrolyte body having oxide ion conductivity. An electrode which measures a measuring gas is provided on a first surface of the solid electrolyte body and an electrode for measuring a reference gas is provided on a second surface of the solid electrolyte body. The electrode used to measure the measuring gas is covered with an electrode protection cover.

The electrode protection layer may also be provided with a catalyst layer, in order to prevent a shift in an output of the gas sensor element, which is caused by generation of hydrogen, contained in exhaust gas. For example, Japanese Patent No. 3488818B discloses an oxygen gas sensor which is provided with of a porous coating layer which covers an electrode for a measuring gas, and a first protection layer disposed on an outer-side of the coating layer. The first protection layer includes a second protection layer which is provided either inside or on top of the first protection layer. The second protection layer is porous layer loaded with a catalyst. This catalyst enhances an oxidation reaction of hydrogen.

A conventional catalyst layer is provided with a noble metal catalyst loaded onto carrier particles. The noble metal catalysts, are Pt—Rh (for example, Pt:Rh=9=1) which are used in view of their heat resistance. On the other hand, an increased severity of exhaust gas emissions regulations has led to a consequential increase in the number of high-load driving areas and a tendency of increased NOx emissions in the environment. In view of these issues, there is a demand for a smoother detection of an air-fuel ratio and improved controllability of feedback thereof. However, when an air-fuel ratio is switched from a fuel-rich state to fuel lean state, it was discovered that the sensor output was imprecise at the switching point. That is, in this case the switching point shifted to the lean side, rather than an optimum purifying region for a gas sensor equipped with a conventional catalyst layer. Therefore even when the exhaust system is within the optimum purifying region, the gas sensor may erroneously determine this be a fuel-rich state, thus, appropriate control of the air-fuel ratio may not be performed. There is also a concern of the NOx emission levels becoming further increased as a consequence.

SUMMARY

In view of the issues described herein above, the present disclosure aims to provide a gas sensor that can suppress an inaccurate output of a gas sensor element, provide a high detection precision and improve reliability of the sensor based on the sensor output.

A mode of the present disclosure is a gas sensor provided with a gas sensor element detecting a concentration of a specific gas contained in a measuring gas, the gas sensor element is provided with a solid electrolyte body having oxide ion conductivity, the solid electrolyte body having a first surface and a second surface. There is also provided a measuring gas electrode disposed on the first surface to be exposed to the measuring gas, and a reference gas electrode disposed on the second surface of the solid electrolyte body to be exposed to reference gas. The gas sensor element is further provided with a catalyst layer which contains a metal catalyst loaded onto a carrier. The catalyst layer has gas permeability and is mounted towards on an outer-side position than the reference gas electrode.

The metal catalyst is a single substance and a specific surface area of the metal catalyst is 0.01 or more and 23 or less, the specific surface area is expressed in an equation 1 below.

$$\text{Specific surface area} = \text{total surface area of a metal catalyst which exists on an electrode unit surface area/an actual electrode surface area per an electrode unit surface area.} \qquad \text{Equation 1:}$$

Effects of Disclosure1

The gas sensor element according to the present disclosure outputs an electromotive force which corresponds to a difference in an oxygen concentration between the measuring gas which has reached the measuring electrode and the reference gas which has contact with the reference gas electrode. At this point, since the metal catalyst consisting of Pt—Rh of the conventional catalyst layer has absorbing facilities for both NO and CO, a permeating quantity of NO is decreased, when changing to a lean atmosphere. That is, it is considered that the decrease in the quantity of NO that reaches the measuring gas electrode and a decrease in sensitivity for NO causes the gas sensor output to shift to the lean-side. In this regard, when the metal catalyst is a single substance, an adsorption rate of CO onto the catalyst layer is higher than NO, thus the ratio of NO/CO which passes through to reach the measuring gas electrode may be increased and as a further result, the NO sensitivity is enhanced.

This effect is obtained when the total surface area of the metal catalyst which comes into contact with the measuring gas is a constant ratio or greater than a constant ratio for the electrode unit area of the measuring gas electrode. That is, the specific surface area shown in the first equation is preferably equal to or greater than 0.01, and equal to or less than 23, therefore when switching to a rich atmosphere, a deterioration in sensitivity for CO is suppressible. The metal catalyst exists on the catalyst layer which is provided further towards an outside thereof, relative to the measuring gas electrode.

As described hereinabove, according to this mode, a shift in the output of the gas sensor element is suppressed, and a high detection precision is achieved. Furthermore, a gas sensor provided with a sensor output based improved reliability may be provided.

It is noted that, symbols are used in claims and summary are shown to provide a correspondence between configuring elements and specified means of embodiments described hereinafter and do not limit a technical range of the present disclosure.

BRIEF DESCRIPTION OF DRAWINGS

In the accompanying drawings.

EMBODIMENTS OF THE DISCLOSURE

First Embodiment

Hereafter, embodiments of the gas sensor of the present disclosure are described, with reference to the figures. A gas sensor element 1 shown in FIG. 1 and FIG. 2 configures a main part of the gas sensor S shown in FIG. 3. The gas sensor S detects a concentration of a specific gas contained in a gas to be measured.

Figure 4:
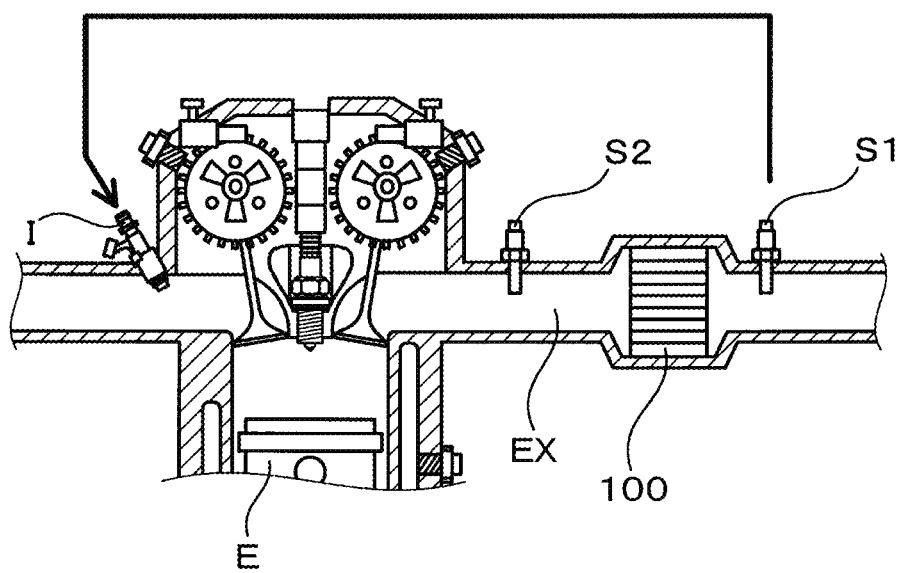
FIG. 4 is an overall schematic view of an exhaust gas purification system used for the gas sensor according to the first embodiment.

As shown in FIG. 4, the gas sensor S may be used as an oxygen sensor or an air-fuel ratio sensor for an exhaust gas purification system of an internal combustion engine of a vehicle, for example. The oxygen sensor detects an oxygen concentration as a specific gas contained in an exhaust which is a measuring gas throughout the specification. The air-fuel ratio sensor detects an air/fuel ratio (also referred to as A/F hereinafter).

Figure 1:
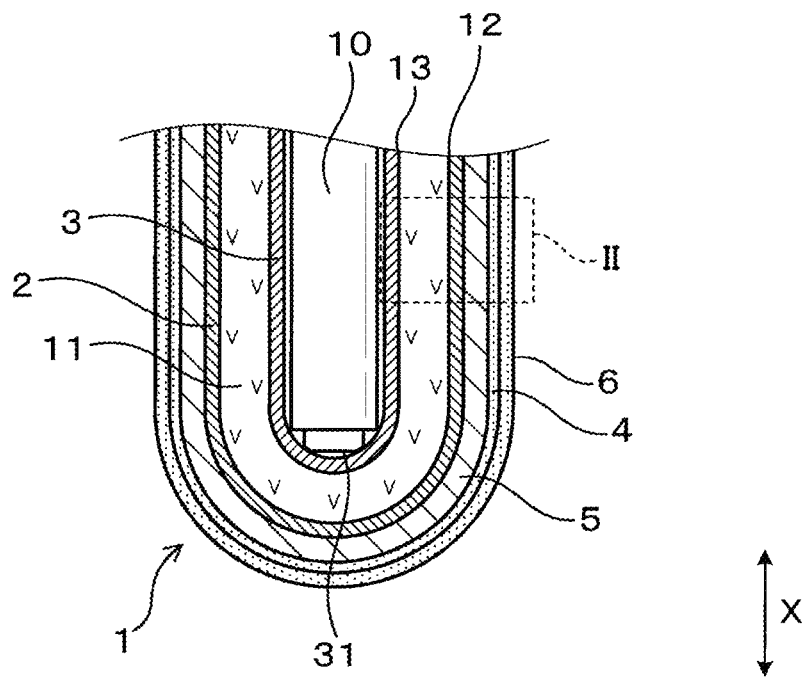
FIG. 1 is a cross sectional view of a front-end section of a gas sensor element in an axial direction as a major part of a gas sensor according to a first embodiment.
Figure 2:
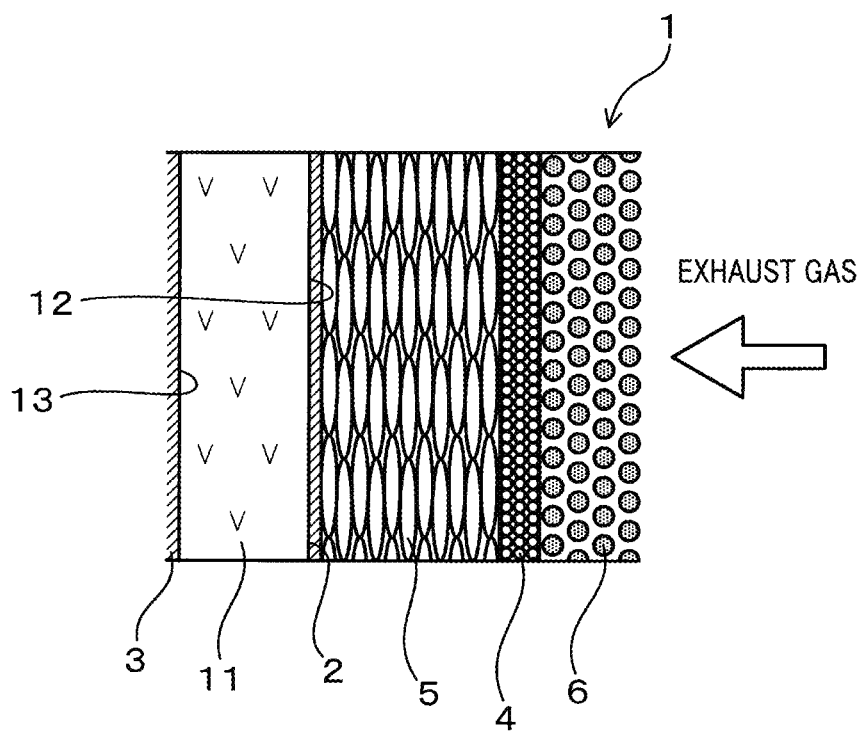
FIG. 2 is enlarged view of a region shown in FIG. 1 of the front-end section of the gas sensor element according to the first embodiment.

As shown in FIG. 1 and FIG. 2, a gas sensor 1 is equipped with a solid electrolyte body 11 which has oxide-ion conductivity, an electrode 2 which used for a measuring gas is disposed on a first surface 12 of the solid electrolyte body 11, an electrode 3 which is used for a reference gas disposed on a second surface 13 of the solid electrolyte body 11, and a catalyst layer 4. The respective first and second surfaces 12 and 13 are provided respectively on a first side of measuring gas and a second side of a reference gas.

It is noted that, the electrode 2 used for the measuring gas will be referred to as a measuring gas electrode 2 and the electrode used for the reference gas will be referred to as a reference gas electrode 3, hereon. The catalyst layer 4 is provided further towards an outside of the gas sensor S relative to the measuring gas electrode 2 which is provided on the first surface of the solid electrolyte body. An electrode protection layer 5 is provided on an outer-surface of the measuring gas electrode 2, and the catalyst layer 4 covers an outer-surface of the electrode protection cover 5. A trap layer 6 is further provided on an outer-surface of the catalyst layer 4.

A vertical direction of gas sensor element 1 is given as an axial direction X, and a reference gas chamber 31 is provided on the inner-side of the solid electrolyte body 11. A rod shaped heater 10 is accommodated inside the reference gas chamber 31.

The catalyst layer 4 is a gas permeable layer which includes a metal catalyst loaded onto a carrier. The metal catalyst loaded onto the carrier is Pt is a single substance. The metal catalyst Pt is formed to have a specific surface area equal to or more than 0.01 and equal to or less than 23, as shown in the equation below. The specific surface area represents an abundance ratio of the metal catalyst per electrode unit (for example, unit: $mm^2/mm^2$).

Specific surface area=total surface area [$mm^2$] of a metal catalyst which exists on a surface of an electrode unit/an actual electrode surface area [$mm^2$] per electrode unit area.     Equation 1:

In providing the metal catalyst Pt as a single substance, an adsorption ratio of CO into the catalyst layer 4 is increased, and a ratio of NO/CO which permeates through the catalyst layer 4 and reaches the measuring gas electrode 2 may also be increased.

In order to obtain the above described effects, the specific surface area of the metal catalyst is preferably equal to or greater than 0.01, a sensitivity of NO of the gas sensor element 1 is thus increased, and suppression a shift in the sensor output to a lean side may also be achieved. Also if the metal catalyst Pt has a specific surface which is equal to or less than 23, the adsorption ratio of CO is not excessively increased, and a CO sensitivity may also be increased, when the fuel switches to a lean-state. The shift in the sensor output to the lean-side throughout the specification is generally considered to be due to only a small quantity of NOx which passes through the catalyst layer 4 to reaches the measuring electrode 2.

A configuration of the gas sensor element 1 which includes the catalyst layer 4 will be described herein after.

Figure 3:
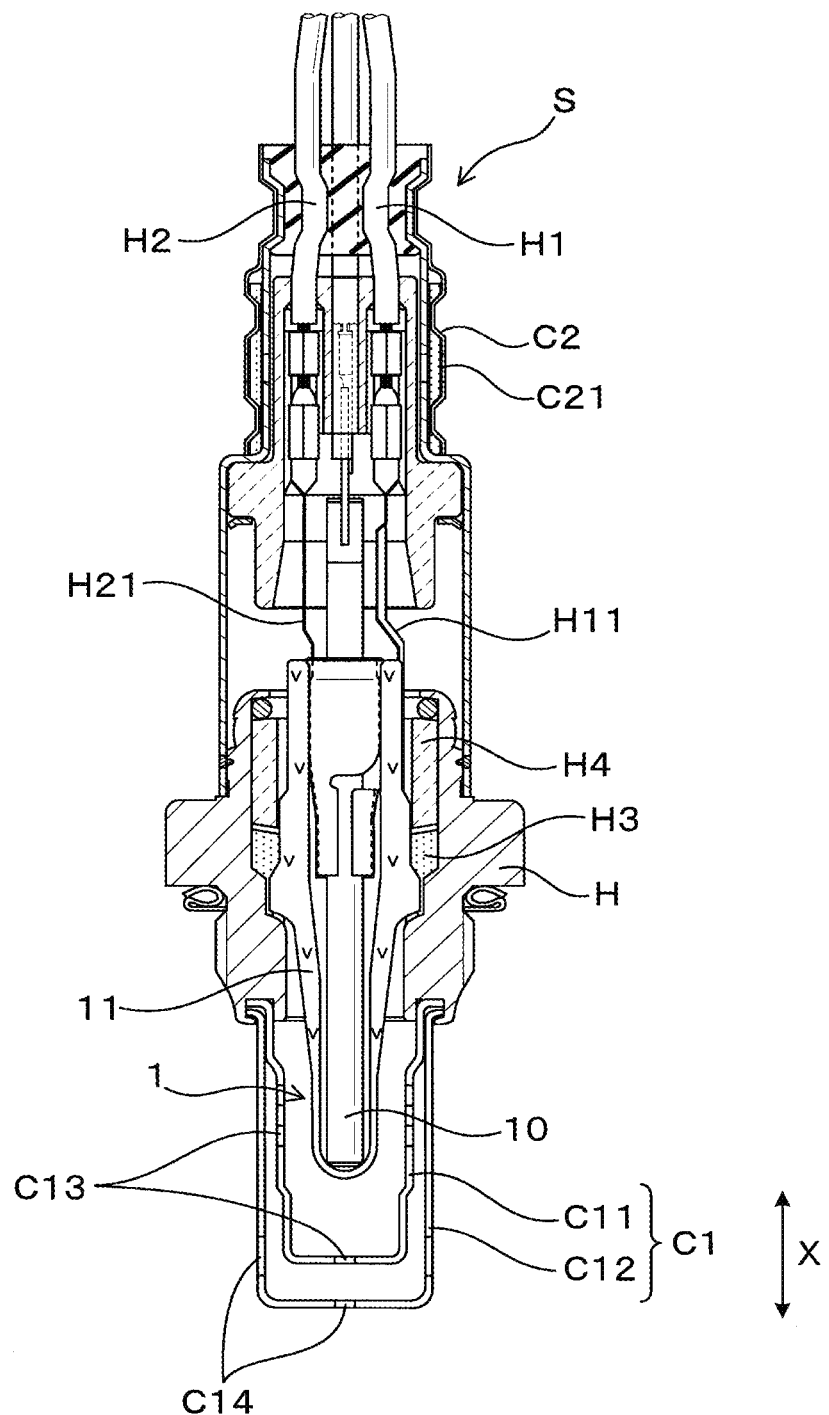
FIG. 3 is a cross sectional view showing a schematic configuration of the gas sensor in the axial direction according to the first embodiment.

As shown in FIG. 3, the gas sensor S is provided with a column shaped housing H, the gas sensor element 1 which is inserted inside the housing H to be maintained therein, an element cover C1 attached to a front end-side and an atmospheric side cover C2 attached to a base end-side of the housing H. A tip end-side of the gas sensor element 1 (specifically, a lower part of FIG. 3) is projected from the housing H and maintained inside the element cover C1. A tip end portion of the gas sensor element 1 is a portion which is projected from the housing H. The tip end portion is provided with the measuring gas electrode 2 and the reference gas electrode 3, and is configured to function as a detecting portion of the gas sensor element 1.

The element cover C1 has a double bottom each of which is a substantial column shape, configured on a respective inner-side cover C11 and outer-side cover C12. The element cover C1 is disposed to surround the front-end portion of the gas sensor element 1. Through-holes C13 and C14 are inlet/outlet holes of the exhaust gas, which are provided on a bottom side surface and a bottom surface of the respective inner-side cover C11 and the outer-side cover C12. Once the exhaust gas, which has passed through the through-holes C13 and C14, has reached a surface of the gas sensor element 1, the exhaust gas is trapped by the trap layer 6 which is the outermost layer, and incorporated inside the gas sensor element 1. A base end side of the gas sensor element 1 (specifically, an upper part of FIG. 3) is configured to extend from the housing H and be accommodated inside the atmospheric cover C2. A through-hole 21 is provided on the column shaped atmosphere-side cover C2 as an opening for atmospheric air. The atmospheric air is the reference gas which is entrapped inside thereof.

A plurality of leads H1 and H2 are connected to an external engine control section (not shown) and kept insulated on an open section at a base end of the atmosphere-side cover C2. Terminal sections H11 and H21 are provided on a tip end-side of the respective leads H1 and H2 and electrically connected to an electrode terminal section, which is not shown in the figures. The electrode terminal sections H11 and H21 are disposed at the base-end part of the gas sensor element 1. The electrode terminal section of the gas sensor element 1 connects to a tip-end portion of the measuring gas electrode 2 and the reference gas electrode through a lead member. At this point an electromotive force based on an oxygen partial pressure difference is generated between the measuring gas electrode 2 and the reference gas electrode 3. A sensor signal corresponding to an oxygen concentration contained in the exhaust gas may thus be obtained by using the electromotive force.

A large center radial section is supported on a portion of the housing H, which has a level difference. A powder substance H3 consisting mainly of talc is filled between an outer surface of the center radial section and an inner surface of the housing H. The sensor element 1 is fixed to the center radial section via a column-shaped insulation member H4, by fastening a thin section of the base end of the housing H.

The gas sensor S is mounted to a wall of an exhaust has pipe EX shown in FIG. 4, for example, by using a thread member provided on an outside of a tip-end portion of the housing H. The gas sensor S configures a part of the exhaust gas purifying system. The vehicle engine E is a gasoline engine, for example, and a catalyst 100 which is used to purify exhaust gas is disposed on the exhaust gas pipe EX, positioned downstream of the engine. The catalyst 100 is a known 3-way catalyst, for example, and the oxygen sensor S1 and the air-fuel ratio sensor S2 are respectively mounted to be positioned downstream and upstream of the catalyst 100.

Detection results of the oxygen sensor S1 and the air-fuel ratio sensor S2 are output to the engine controller which is not shown in the diagrams. The engine controller controls combustion in a combustion chamber, such that the air-fuel ratio is a stoichiometric air-fuel ratio near to A/F=14.5, for example.

Figure 5:
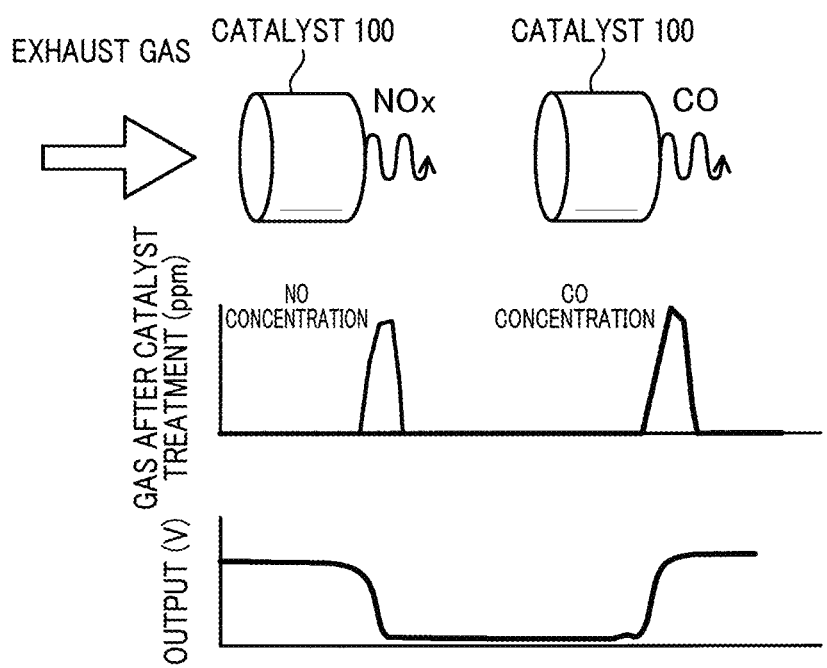
FIG. 5 is a diagram showing a relation between a change in an NO concentration or a CO concentration in exhaust gas at a downstream side of a catalyst disposed on the exhaust gas purification system, and a sensor output of a first embodiment.

A case in which the gas sensor S is used as oxygen sensor will now be described. After the exhaust gas is purified by the catalyst 100, post treated exhaust gas reaches the oxygen sensor S1 which is located downstream of the catalyst 100. For example, as shown in FIG. 5, when the air-fuel ratio is switched to the lean-fuel state, in which NO abundant in the exhaust gas from lean-fuel is emitted downstream of the catalyst 100 and the NO concentration is increased. On the other hand, when the air-fuel ratio is switched to the rich-state, in which CO which is abundant in the exhaust gas from rich-fuel is emitted downstream of the catalyst 100 and the CO concentration is increased. The engine controller controls feedback of a combustion pumping volume from the injector I shown in FIG. 4, based on detected results of the NO and CO concentrations. As a result, the oxygen sensor S1 having a high sensitivity is required when the A/F ratio is switched to either the lean state or the rich state.

As shown in FIG. 1, the gas sensor element 1 of the present mode is configured as a cup-shaped element which includes the solid electrolyte body 11 formed in a hollow cup-shaped provided with a bottom. The electrolyte body 11 is formed of a zirconia-type solid electrolyte material which has zirconia (specifically, $ZrO_2$) for example, as a major component. The measuring gas electrode 2 is formed on the outer-side surface namely being the surface 12, and the reference gas electrode 3 opposing the measuring gas electrode 2 is formed on an inner-side surface namely being the surface 13. It noted than the outer surface and the inner surface refers to surfaces on a respective outer-side and inner side of the solid electrolyte body 11. An inner space of the electrolyte body 11 forming the reference gas chamber 31 is connected to an inner space of the atmosphere-side cover 2 which is provided on the base-end side of the gas sensor element 1. A partially stabilized zirconia which has yttria stabilizer added to zirconia, for example, may be used as the zirconia-type solid electrolyte material.

The measuring gas electrode 2 and the reference gas electrode 3 are gas permeable electrodes configured of electrode materials including noble metal elements, for example. Platinum (Pt) is preferably used as a noble metal element. Additionally, Pt which has small quantities of at least one of Pd (palladium) Rh (rhodium) and Au (gold) added thereto may be also used. The outer surface of the measuring gas electrode 2 is covered by the electrode protection cover 5 which is a porous layer. A porous ceramic layer consisting of an oxide compound or an oxide which contains magnesium (Mg), aluminum (Al) and thallium (Ti), for example, may be used as the electrode protection layer 5. Specifically, the electrode protection layer may be configured of magnesium alumina spinel ($MgO \cdot Al_2O_3$), titania ($TiO_2$) and alumina ($AlO_2$), for example.

The outer surface of the electrode protection layer 5 is covered by the catalyst layer 4 and exhaust gas which passes through the trap layer 6 provided on the outside of the catalyst layer 4 is introduced. The trap layer 6 captures toxic substances contained in the exhaust gas, and is configured of a porous ceramic layer consisting of γ alumina for example.

Figure 6:
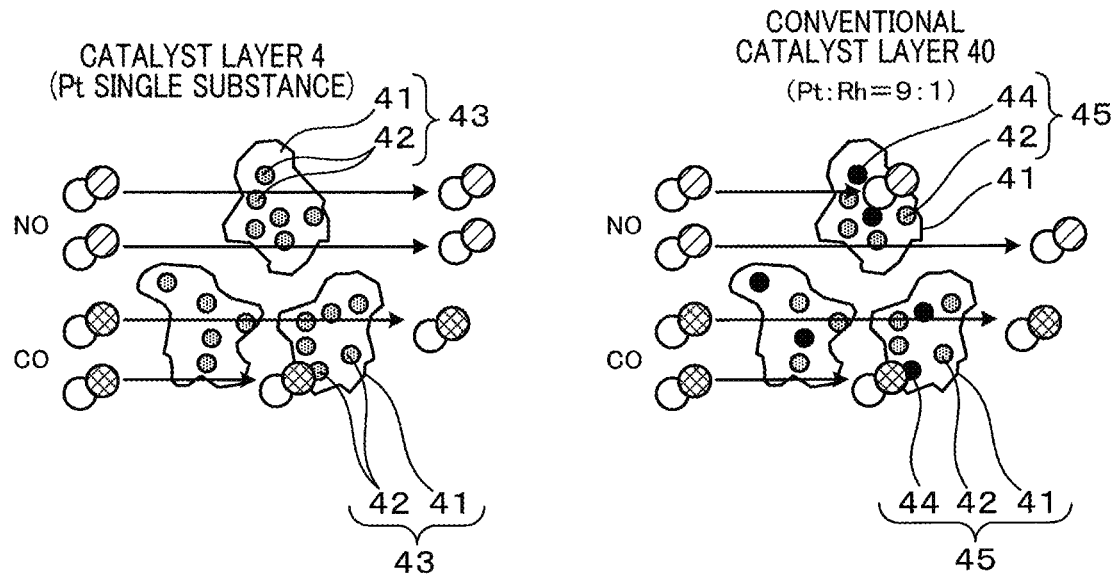
FIG. 6 is a schematic configuration showing a catalyst layer of the gas sensor element and an adsorption effect of NO and CO according to the first embodiment comparatively described with a catalyst layer of a conventional gas sensor.

The catalyst layer 4 is configured of a large number of catalyst particles 43 which are assemble together, as shown in FIG. 6. The catalyst particles 43 are the Pt particles 42 loaded onto porous carrier particles 41. The carrier particles 41 may be configured as porous ceramic layers consisting of alumina, for example. That is, θ alumina, γ alumina and α alumina, for example, may be used, however, θ alumina is preferably used since an output variation caused by deterioration, for example, due to long-term use is effectively suppressed.

The catalyst layer 4 has permeability such that the exhaust gas passes through gaps which are formed between the catalyst particles 43, and the NO and CO which is contained in the exhaust gas is partially adsorbed by contact of the exhaust gas with Pt particles on a surface of the carrier particles 41. At this point, the metal catalyst that is loaded onto the catalyst particles 43 is a single substance Pt, and has no other metal catalyst component contained therein. If the metal catalyst is provided as a single substance Pt, there is a difference between the adsorption of NO and CO, that is, NO permeates through the catalyst particles 43, whereas CO is largely adsorbed onto the catalyst particles 43. In this way, prioritizing CO adsorption increases the NO/CO ratio. Specifically, the NO/CO ratio permeating through the catalyst layer 4 is increased, thus, the level of NOx reaching the measuring gas electrode 2 is also increased, and the NOx sensitivity may also be enhanced.

In contrast, with conventional catalyst layer 40 shown in FIG. 6, if an assembly of catalyst particles 45 which has Rh (rhodium) particles 44 in addition to Pt particles 42 as a metal catalyst loaded thereon, adsorption for both NO and CO is facilitated, therefore, not only CO but also NOx is adsorbed, therefore NO permeates through the catalyst layer 40 with difficulty as a result. In this case, since the NO/CO ratio reaching the measuring gas electrode 2 is low, it is considered that the sensitivity for NO is decreased.

Figure 7:
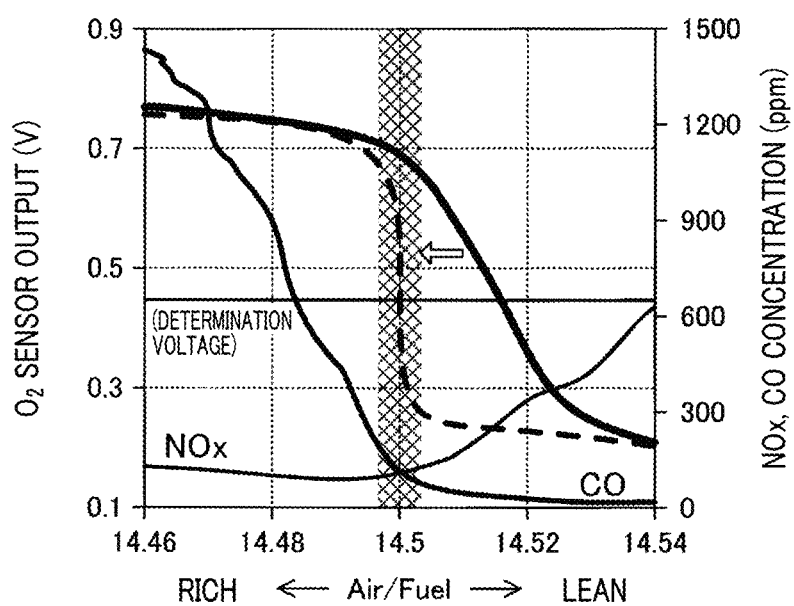
FIG. 7 shows a relation between a composition of exhaust gas introduced into the gas sensor and the output of the gas sensor according to the first embodiment.

Next, a relation between the decrease of NO sensitivity and the output of the gas sensor element 1 will be described. As shown in FIG. 7, the sensor output of the gas sensor element 1 is theoretically higher than a voltage which is determined in the rich-state of combustion and lower than a voltage which is determined in the lean-state of combustion. Also, the sensor output has a feature of suddenly changing at the stoichiometric air-fuel ratio (A/F=14.5) (specifically shown with the broken line in the graph shown in FIG. 7). This is due to optimization of a purifying performance of NO and CO, which is performed near to the stoichiometric air-fuel ratio by the three-way catalyst. If, however, the optimum purifying range is missed, emission levels of CO on the combustion rich side are increased and the emission levels of NO on the combustion lean side are increased, for example, as a consequence.

The exhaust gas purification system shown in FIG. 4 uses this theory as an indication to perform the feedback of the A/F ratio. Specifically, if the output of the gas sensor element 1 indicates that the A/F ratio is in the fuel rich-state, the exhaust gas purification systems performs feedback control such that lean fuel is performed. In contrast, if the gas sensor output is indicates the lean-fuel state, then the A/F ratio feedback is controlled to the fuel-rich state.

Figure 8:
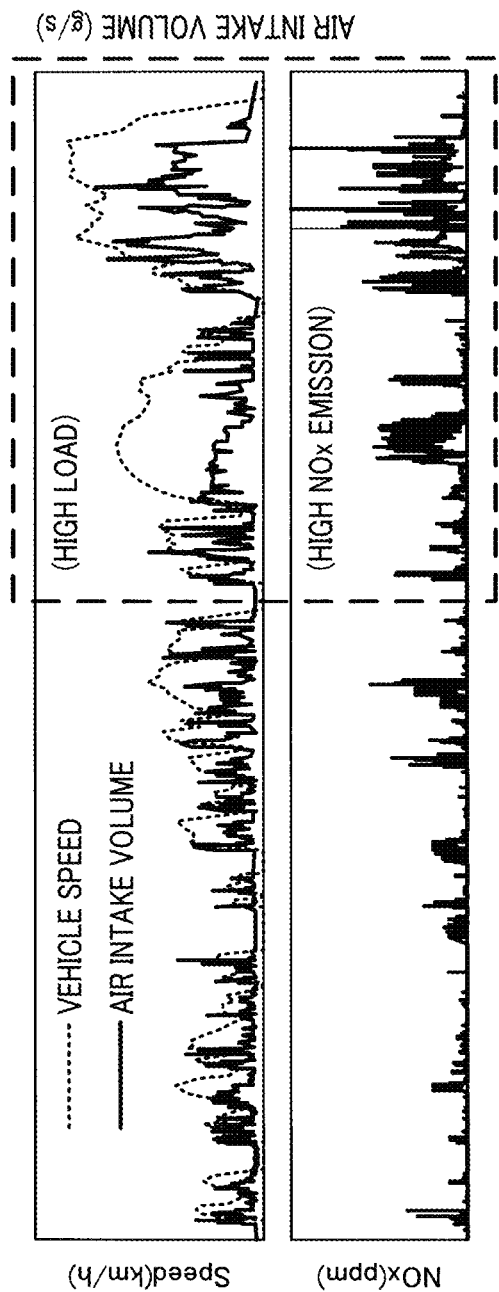
FIG. 8 shows a an example simulation of relation between a running pattern of a vehicle equipped with an exhaust has purification system, and the NO concentration in the exhaust gas according to the first embodiment.

However, due to implementation of new regulations for exhaust gas, exemplified in the running pattern of FIG. 8, NOx emissions levels have a tendency to increase with an increase in a number of medium and high load driving regions. It was discovered that the sensor output gradually decreased, as shown with a solid line in FIG. 7, when the gas sensor element was equipped with the conventional layer 40. In this case, when A/F ratio changes from the rich-fuel to the lean-fuel, since a switching point (hereon, defined as λ point of the sensor output) shifts from the optimum purifying range to the lean-fuel state thereof, the output from the gas sensor element 1 indicates a rich-fuel state, when in fact the A/F ratio is in the lean-fuel state. In this case, if the feedback control is performed such that the A/F ratio is in a lean state based on the determined output of the gas sensor element 1, emission levels of NOx are increased as consequence, thus controllability thereof deteriorates.

Figure 9:
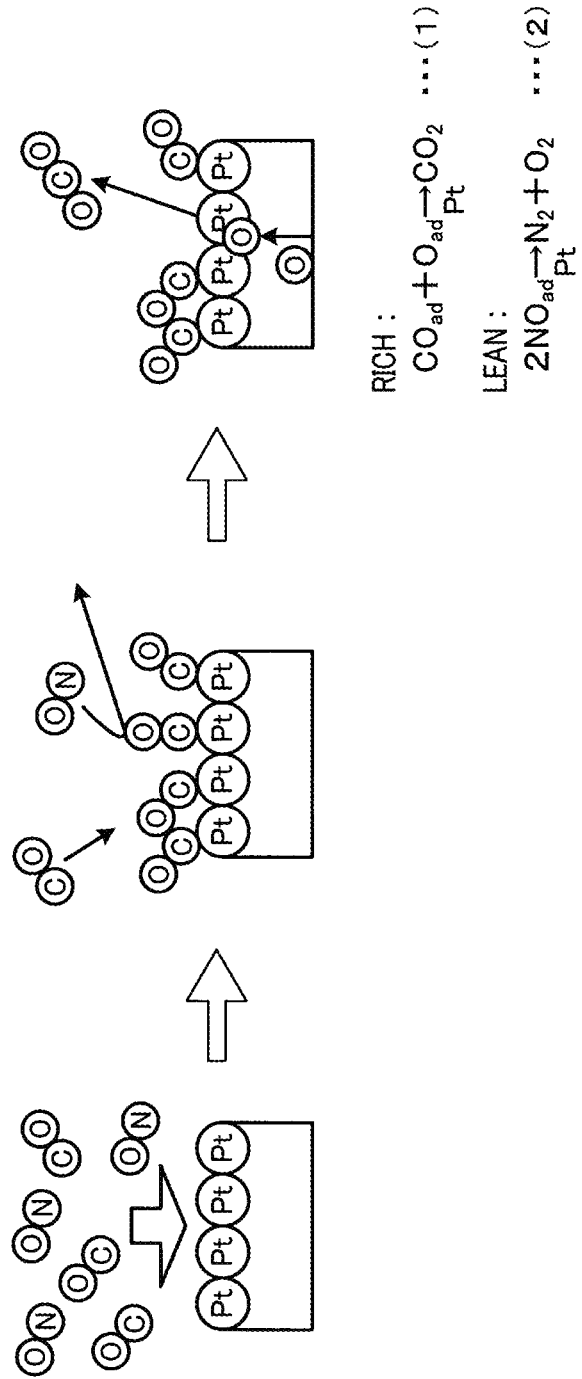
FIG. 9 shows a schematic view describing a mechanism of a lean shift of the sensor output of the gas sensor according to the first embodiment.
Figure 10:
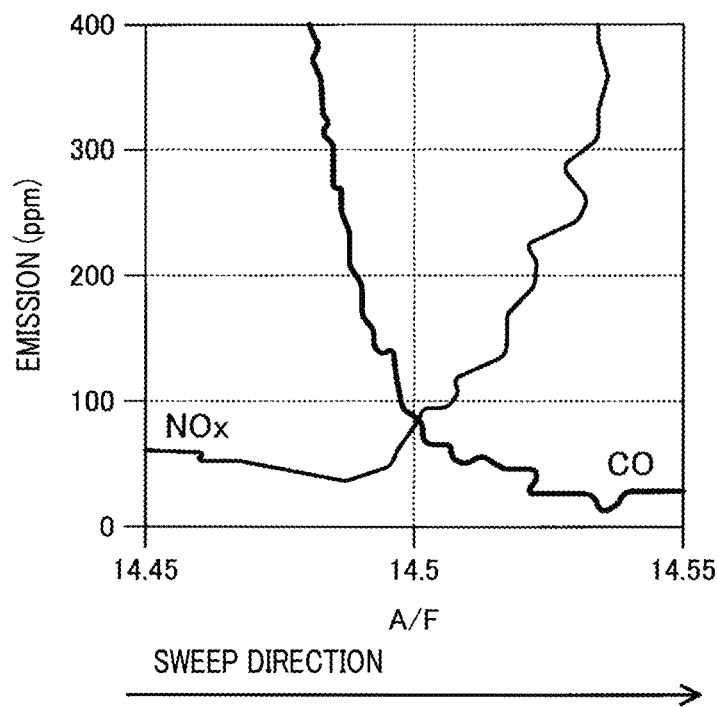
FIG. 10 shows a relation between an air fuel ratio of the exhaust gas introduced into the gas sensor, and the NO concentration and CO concentration contained in the exhaust gas according to the first embodiment.
Figure 11:
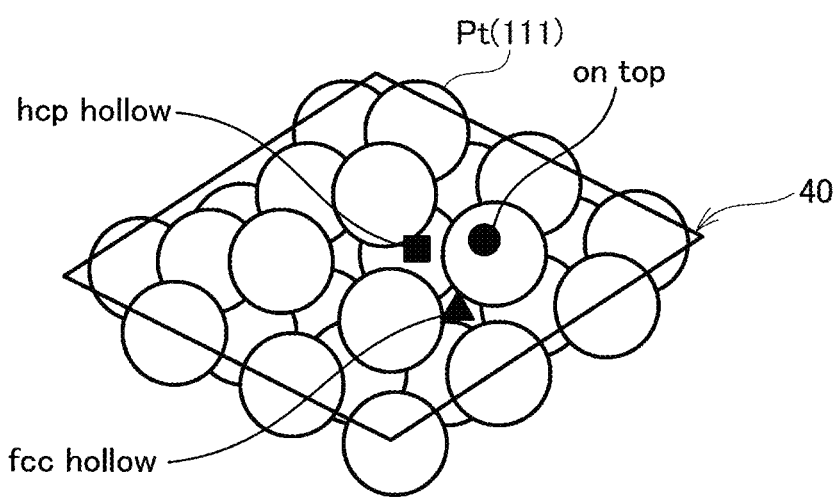
FIG. 11 shows a schematic view of an adsorption site on a surface of Pt configuring the catalyst layer of the gas sensor according to the first embodiment.
Figure 12:
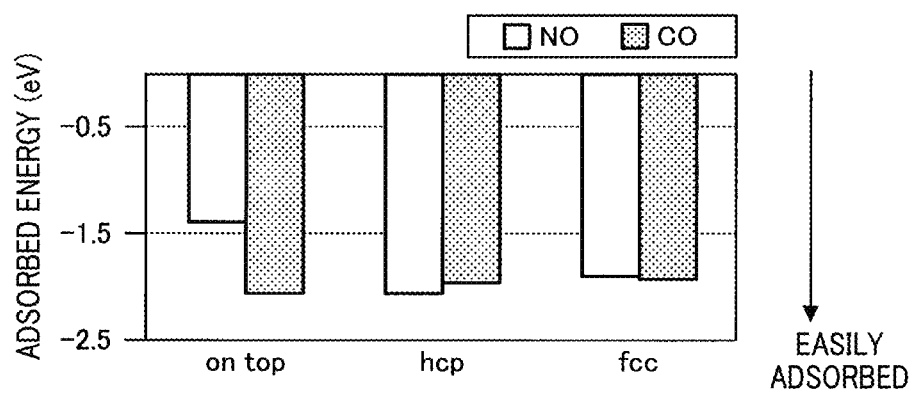
FIG. 12 shows an adsorption energy relation corresponding to NO and CO contained in the exhaust gas, according to the first embodiment.

As shown in FIG. 9, emission levels of NOx may be further increased when the measuring gas electrode 2 mainly consists of Pt. As shown in FIG. 10, the composition of the exhaust gas on the downstream side of the three-way catalyst has a combined abundance of CO and NO, for example, when the A/F is near to 14.5, in the medium to high load operating regions. In contrast, as shown in FIG. 11 and FIG. 12, the adsorption of CO and NO on a Pt (111) surface occurs on a top site which is directly on top of the surface (on top), on a hollow site of a hexagonal close packed structure (hcp), and on a hollow site of a face centered cubic shape fcc. Specifically, the adsorption of CO and NO occurs on any one of the above mentioned sites on the surface of Pt. At this point, an adsorption energy will differ depending on a type of gas and the site into which the CO and NO is adsorbed. However, since a value of energy is a negative value (specifically, generated heat reaction) each of the sites will become stable due to the adsorption energy. In particular, on the on-top site, the difference in the adsorption energy between CO and NO is large, and since an absolute value of the adsorbed energy of CO is larger than NO, the adsorption of CO is prioritized.

In this regard, due to the difference in the adsorbed energy, the adsorption of CO on the surface of Pt of the measuring gas electrode is prioritized (refer to a center drawing of FIG. 9) even in a situation where the same quantity of CO and NO are contained in the exhaust, which is introduced into the measuring gas electrode (refer to a left drawing of FIG. 9). When the composition of the exhaust gas is near to the stoichiometric air-fuel ratio, the following reactions (1) and (2) shown below occurs on the measuring gas electrode 2. If CO is surplus, an output indicating the rich fuel is produced and in contrast a lean output indicating the lean state is produced when NO is surplus.

$$Rich(Pt): CO\ ad + O\ ad \rightarrow CO2 \quad (1)$$

$$Lean(Pt): NO\ ad + \rightarrow N2 + O\ ad \quad (2)$$

As a result, if the adsorption of CO on Pt is prioritized, the gas sensor element 1 outputs a value indicating a rich fuel as shown in the drawing on the right of FIG. 9, and therefore an occurrence of the point γ shifting to the lean side was an issue with the conventional catalyst layer.

According to the present mode, the catalyst layer 4 which is provided on the outer-side relative to the measuring gas electrode 2 is formed by using the single substance Pt, therefore the sensitivity of the sensor for NO is enhanced. As the conventional catalyst layer 40 contains noble metals, such as, Rh and Pd which have high adsorbing functions for NO as was previously described, the adsorption of only CO may not be accomplished. However, by forming the catalyst layer 4 with the single substance Pt, partial adsorption of only CO may be achieved. Furthermore, the quantity of CO reaching the measuring gas electrode 2 is decreased, and by increasing the relative quantity of NO, the shift of the λ point from the optimum purifying range to the lean-state may be suppressed.

Figure 13:
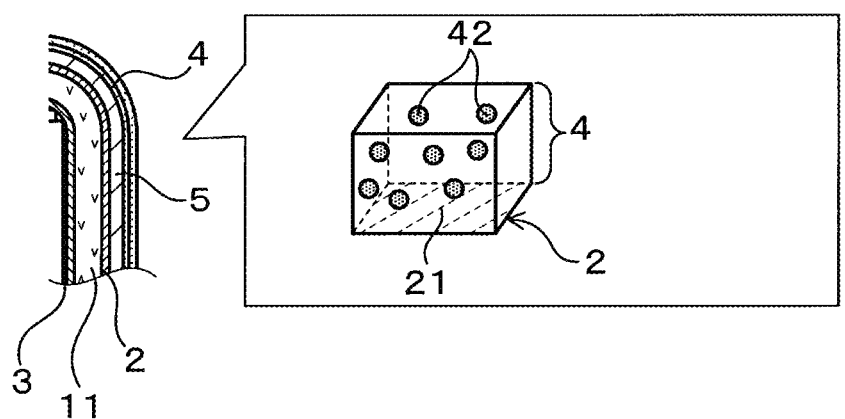
FIG. 13 is a schematic view showing a main part of the gas sensor enlarged, and the catalyst layer descriptively showing a calculating method of a specific surface area of the catalyst layer of the gas sensor element according to a first example.

As shown in FIG. 13, the catalyst layer 4 is disposed on top of the surface of the measuring gas electrode 2 via the electrode protection layer 5. The adsorption of CO changes according to a quantity of the Pt particles 42 contained in the catalyst layer 4. Specifically, the larger the total surface area of the Pt particles 42, the easier it becomes for CO contained in the exhaust gas to make contact with the Pt particles and the adsorbing ability of CO (referred to as CO adsorbing ability, hereon) is increased. The Pt particles 42 exist on top of a unit surface area of the measuring gas electrode 2, (refer to the enlarged diagram in FIG. 13). As shown in an equation in FIG. 13 (specifically, equation 1), the specific surface area of the metal catalyst of the catalyst layer 4 is defined as follows; a percentage of the total surface area of Pt particles 42 contained in the catalyst layer 4 which exists on top of the electrode unit surface area, which is relative to the actual electrode surface area per electrode unit surface area. The range of the specific surface area is configured to be 0.01 or more and 23 or less.

The actual electrode surface area is an electrode surface area on which the metal catalyst actually exists, among the unit surface area 21. A void (minute pores) exists in the measuring gas electrode 2. Since the metal catalyst is not formed on the void parts, the actual surface area per the electrode unit surface area is the surface area of the electrode with the void parts, which are the minute pores, subtracted therefrom, per electrode unit surface area. Calculation may be performed using Scanning Electron Microscopic images (SEM) for example. The total surface area of the metal catalyst is a summation of the surface area of Pt particles 42 on the top of the unit surface area 21. The total surface area of the metal catalyst existing on the electrode unit surface area is obtained by calculating the surface area for one single metal catalyst, for all metal catalysts on the electrode unit surface area. Any one of calculating equations (A) to (C) may be used to define the total surface area of the metal catalyst.

{[1×layer thickness of catalyst layer×(1−catalyst layer porosity)×carrier density×percentage of Pt particles loaded (mass weight %)]/mass weight per 1 Pt particle}×surface area per 1 Pt particle.   (A)

Dispersed quantity of catalyst (number/m$^2$) per electrode unit surface area×surface area per one Pt particle.   (B)

[Dispersed quantity of catalyst (mass weight/m$^2$) per electrode unit surface area/mass weight per 1 Pt particle]×surface area per 1 Pt particle.   (C)

In this way, the defined specific surface area is not affected by the thickness of the catalyst layer 4 or a size of the catalyst particles 43, for example, and can also be used to as an indicator expressing the adsorbing ability of CO. Additionally, if the catalyst layer 4 contains the Pt particles 42, the NOx sensitivity is enhanced and a suppression effect of the shift of the sensor output also obtained, by providing the specific surface area within the range described herein above.

The catalyst layer 4 has porosity preferably between 20 to 60%. If the porosity is less than 20%, a diffusion rate of gas decreases, thus a response of the sensor is easily decreased. In contrast, if the porosity is greater than 60%, large volumes of gas pass through the catalyst filter 4 and the Pt particles are exposed to these large quantities. As a consequence, aggregation and transpiration of the metal catalyst on the carrier particles rapidly progresses, and the adsorption ability of CO may decrease as a consequence. However, if the catalyst layer 4 is formed such that the porosity is between 20 to 60%, the sensor response is desirably maintained, and output variation of the sensor may also be prevented.

The catalyst layer 4 has a thickness which is preferably between 10 μm to 60 μm. If however, the thickness is thinner than 10 μm, a sufficient specific surface area of the metal catalyst may not be achieved, and enhancement of the NOx sensitivity may also not be accomplished. In contrast, if the thickness of the catalyst layer 4 is greater than 60 μm, there is a concern that the response of the sensor will deteriorate, due to a longer dispersing duration of NO and CO inside the catalyst layer 4. Therefore by providing the layer thickness between 10 μm and 60 μm, a sufficient specific surface area thereof is secured, the NOx sensitivity enhanced, and maintained responsiveness of the sensor may also obtained at the same time. Since the thickness is 10 μm or more, an even thickness of the catalyst layer 4 may be easily achieved, and deformation or damage, for example, misalignment, movement and ripping of the catalyst layer 4 may be prevented.

The catalyst layer 4 is configured to have a catalyst-loading ratio, preferably in a range of 0.1 to 3% mass weight. The catalyst-loading ratio is the mass weight percentage of the metal catalyst (specifically Pt) contained in the catalyst layer 4, relative to a total mass weight of the catalyst layer. In high temperature lean-fuel environments, transpiration of Pt particles occur, and in high temperature rich-fuel environments, the aggregation of the Pt particles progress. Therefore, if the catalyst-loading ratio is smaller than 0.1% mass weight, then the CO adsorption ability of the catalyst layer 4 deteriorates, and there is a concern that the NOx sensitivity may also decrease, as a consequence of transpiration and/or aggregation of the metal catalyst. Furthermore, if a catalyst is loaded to be higher than 3% mass weight, the aggregation of the metal catalyst easily progresses under rich environment conditions, since a distance between the metal catalyst portions is inadequate. Thus, by providing the catalyst loading percentage between 0.1 and 3% mass weight, either transpiration or aggregation of the metal catalyst which causes the decrease in CO adsorption is suppressed, and output variability of the sensor prevented. Also, an enhanced durability of the sensor may be achieved.

The catalyst particles 43 which form the catalyst layer 4 are configured to have an average particle diameter preferably between 0.1 μm and 0.8 μm. If, for example, the average particle diameter is smaller than 0.1 μm, the Pt particles 43 easily move and also aggregation progresses easily under high temperature conditions. In contrast, if the average particle diameter is larger than 0.8 μm, a sufficient distance between the particles is not secured, and aggregation of the catalyst particles easily progresses at high temperatures. Therefore, if the average particle size of the catalyst particle is between 0.1 μm to 0.8 μm, progression of the aggregation of particles is suppressed, output variation due a decrease in the CO adsorption is prevented, and durability of the sensor may be enhanced.

The electrode protection layer 5 preferably has a thickness of 60 μm or more. As a result, the exposure of the measuring gas electrode 2 to high temperature gas is prevented, thus aggregation and transpiration of noble metals that form the measuring gas electrode 2 is prevented. As a result, the variation characteristics due to deterioration of the measuring gas electrode 2 may be suppressed.

The porosity of the electrode protection cover 5 is preferably lower than the porosity of the catalyst layer 4. As a result, the measuring gas easily remains inside the catalyst layer 4, and the sensitivity of NOx may be enhanced as CO is sufficiently adsorbed by the catalyst layer 4.

First Example

Next, the gas sensor element 1 provided with the configuration described above was constructed and used as a gas sensor for evaluation. The specific surface area of the metal catalyst on the catalyst layer 4 was confirmed. The gas sensor element 1 is configured of the solid electrolyte body member 11 which is obtained by forming partially stabilized zirconia into a cup shape and sintering thereof. The measuring gas electrode 2 consisting of Pt is formed on an outer-surface of the solid electrolyte body 11, and the electrode protection layer 5 which consists of MgO Al$_2$O spinel is disposed on the outer-side of the measuring gas-electrode 2 by using plasma powder spraying. The reference gas electrode 3 consisting of a Pt electrode was formed on an inner surface of the solid electrolyte body 11. Additionally, the catalyst layer 4 is configured to cover the electrode protection layer 5, and the trap layer 6 consisting of γ alumina is disposed to cover the catalyst layer 4.

The catalyst layer 4 was formed by θ alumina particles with Pt added thereto. The Pt particle 42 was loaded onto the carrier particle 41 and this was provided as the catalyst particle 43. The solid electrolyte body 11 provided with the electrode protection layer formed thereon was then immersed into a catalyst solution dissolved in water which contained the catalyst particles 43 and then heat treated at a high temperature (for example, 1000° C. or higher), thereby forming the catalyst layer 4.

The gas sensor element 1 was accommodated inside the housing H, and the element cover C1 and atmospheric cover C2 mounted thereto. The configured gas sensor element 1 was used to investigate effects on the output sensitivity of the gas sensor S, and the respective surface area was changed, based on the equation 1. At this point, for example, the total surface area of the metal catalyst in the equation 1 was changed by changing a layer thickness, a porosity and a loading percentage of the Pt particles of the catalyst 4 in the calculating equation (A). The thickness of the catalyst layer 4 was adjusted by changing an immersion treatment condition of the catalyst water solution, and the porosity thereof was adjusted by changing the particle diameter of the θ alumina particles. Thus the specific surface area of the gas sensor element 1 adjusted in a range of 0 mm$^2$/mm$^2$ to 30 mm$^2$/mm$^2$ was obtained.

Figure 14:
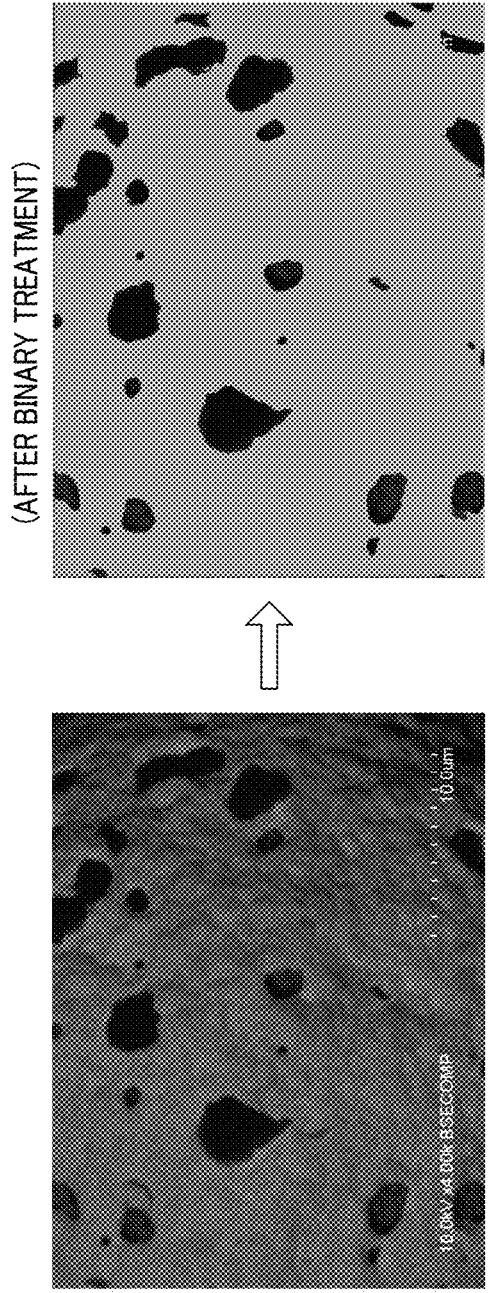
FIG. 14 is a diagram showing a scanning electron microscopic image (referred to as SEM hereon) of an electrode surface used to calculate the specific surface area of the catalyst layer of the gas sensor element and binarized image according to the first embodiment.

The actual surface area of the electrode per electrode unit surface area is the surface of the measuring gas electrode 2 with the void areas of the electrode unit surface area removed therefrom. That is, the actual surface area was calculated according to the steps (1) to (3) described below.
(1) The SEM image of the measuring gas electrode 2 is obtained (for example, the SEM image which is shown on a left side of FIG. 14 is enlarged by 4000 times).
(2) Binarization of the SEM image of the measuring gas electrode is performed using imaging analysis software, and a binarized image (for example, as shown in an image on the right of FIG. 14) is used to calculate the surface area of the electrode with the nest sections subtracted therefrom.

(3) The electrode surface area calculate in (3) and (2) is recalculated per unit surface area, and this value is provided as the actual electrode surface area.

Figure 15:
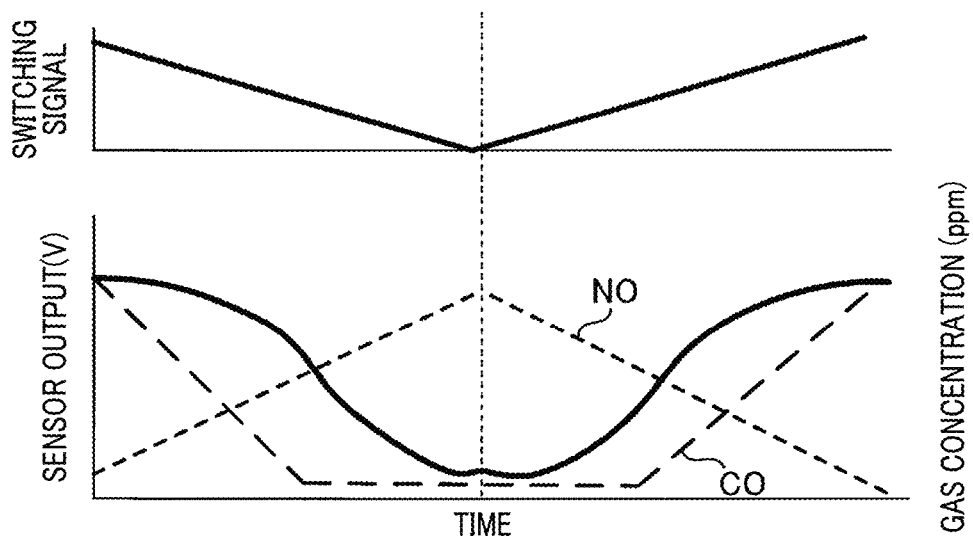
FIG. 15 shows a switching signal descriptively showing a method for evaluation of a sensitivity of the output of the gas sensor and a relation between the sensor output and gas concentration according to the first example.
Figure 16:
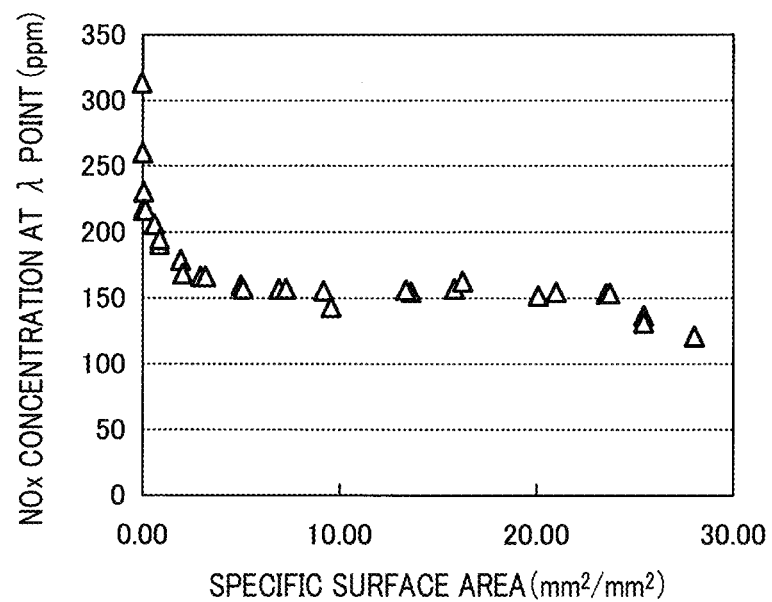
FIG. 16 is a diagram showing a relation between the specific surface area of the catalyst layer of the gas sensor and a NOx concentration at a λ switching point according to the first example.
Figure 17:
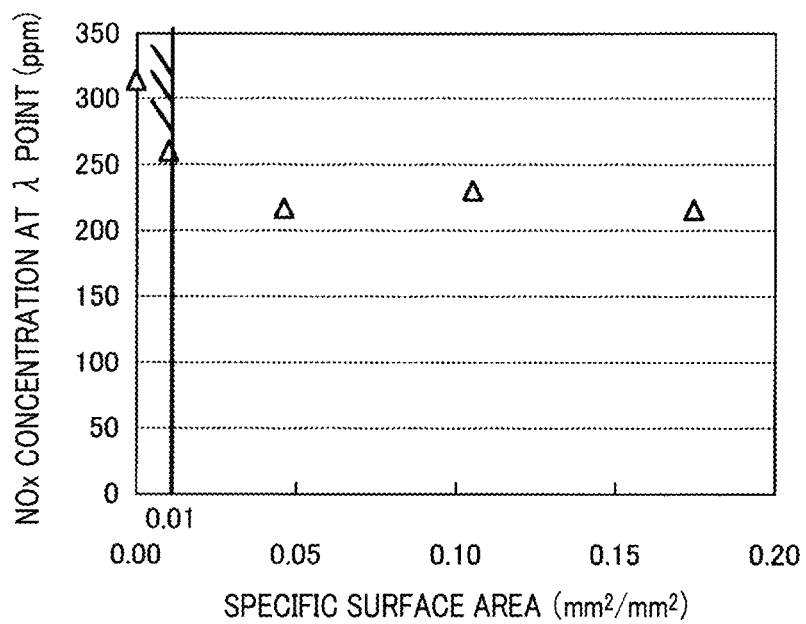
FIG. 17 is a diagram showing the relation between the specific surface area of the catalyst layer of the gas sensor and the NOx concentration at the λ point according to the first example.

The output sensitivity of the gas sensor S was evaluated by using a test machine which was considered to be equivalent to the exhaust gas purification system shown in FIG. 4. The gas sensor S was mounted on the downstream-side of the catalyst 100 disposed on the exhaust pipe EX, and a test gas containing NOx and CO was introduced thereto. As shown in FIG. 15, an A/F ratio of the test gas introduced was continuously switched (for example: A/F 14 to 15) and the NO concentration or the CO concentration was evaluated when the sensor output reached the determined voltage. Conditions of the evaluation are shown below.
Number of Engine revolutions: 3000 rpm (revolutions per minute)
Exhaust volume: 2.5 L
Amount of Air-fuel intake: 25 g/second As shown in FIG. 16, when the fuel switches from the rich state to the lean-state, the NOx concentration at the λ point suddenly decreases with an increase of the specific surface area. As shown in FIG. 17, an effect of the CO adsorbing ability of the catalyst layer 4 is apparent at a specific surface area of 0.01 mm$^2$/mm$^2$ or more. That is, when the specific surface area is preferably increased to 0.05 mm$^2$/mm$^2$ or more, there is a relative increase in NOx passing through the catalyst layer 4 and the prevention of the shift in the output of the gas sensor is effectively enhanced by the increase in the NOx sensitivity of the measuring gas electrode 2.

Figure 18:
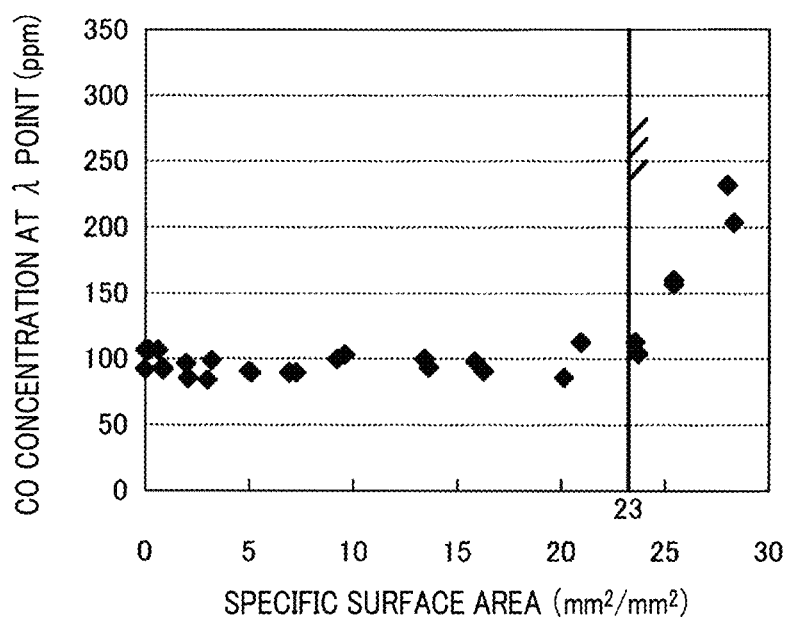
FIG. 18 is a diagram showing the relation between the specific surface area of the catalyst layer of the gas sensor and the CO concentration at the λ point, an arrow A indicating an enlarged part of FIG. 17 according to the first example.
Figure 19:
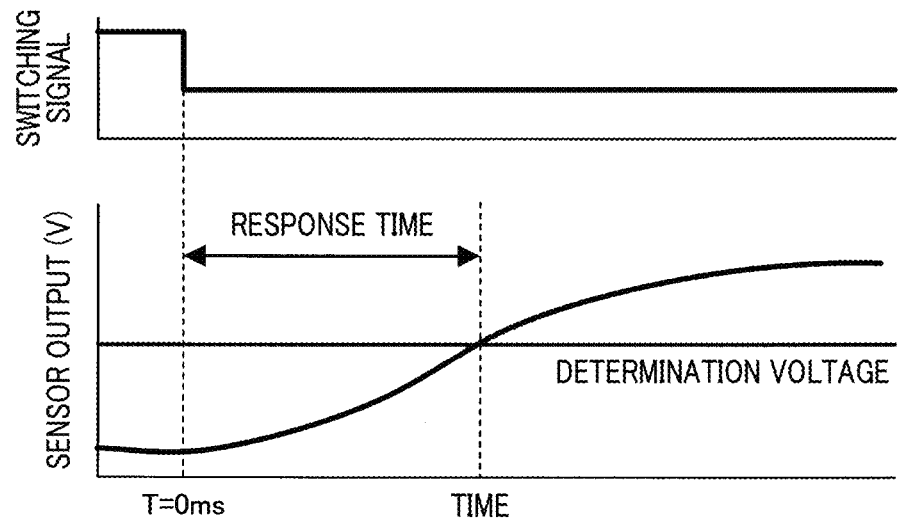
FIG. 19 is a switching signal describing a method of evaluating an output sensitivity of the gas sensor and a relation between the sensor output and the gas concentration according to a second embodiment.

The NOx sensitivity of the gas sensor S as shown in FIG. 16 is more or less stable at 0.1 mm$^2$/mm$^2$ or more. However, if the specific surface area is relatively large, the CO adsorbing ability of the catalyst layer 4 will also be increased further, and the CO sensitivity effected at the switching point from the lean-side to the rich-side. In this case, as shown in FIG. 18, the CO concentration increases at the λ point when the specific surface area exceeds 23 mm$^2$/mm$^2$. Therefore, by configuring the catalyst layer 4 such that the specific surface area is 0.01 mm$^2$/mm$^2$ or more and 23 mm$^2$/mm$^2$ or less, the output sensitivity of the gas sensor S may be desirably maintained.

Second Example

The following parameters were evaluated when using the gas element sensor 1 provided with the same basic configuration described above and various changes which are shown in Table 1 (refer to samples 1 to 22 in table 1). The parameters were specifically, a porosity (shown as CL POR in table 1) and thickness (CL THK) of the catalyst layer 4, a ratio of Pt particles on the catalyst layer 4 (specifically a catalyst loading ratio (C LOAD RATIO)), an average diameter of the catalyst particle (average particle diameter (AVE PAR DIAM), and a thickness (PL THK) and porosity (PL POR) of the electrode protection layer 5. The constructed gas sensors S of the samples 1 to 22 were each used to determine the responsiveness of the gas sensor S (response of gas sensor S) and the NOx sensitivity thereof. The response of the gas sensor S was determined by switching an air/fuel ratio of the test gas introduced thereto in a stepwise manner (for example, from A/F=14 to A/F 15), and by a time until the sensor output reached a predetermined voltage from a point in which a signal was switched.

The evaluation conditions were as follows. The gas sensor S was disposed upstream of the catalyst 100 and an exhaust gas temperature was measured in the same position.
Number of engine revolutions: 1500 rpm
Exhaust Gas volume: 2.0 L
Air intake volume 8 g/second
Exhaust gas temperature: 350° C.

A response of the gas sensor S was determined by a determination reference given as an initial response which was equal to or lower than a time of the conventional sensor, and a response which had a variable response time which was equal to or lower than a target variable response evaluation after endurance. The target variable response evaluation is referred to as a target variable response. If both of the conditions above were satisfied the evaluation of the gas sensor was good (G) and when neither of these conditions were satisfied the evaluation was failed (F) show in the results in table 1. Also, the NOx sensitivity was evaluated in the same manner as the first example, and a variable sensitivity of NOx was determined by using the target value of evaluation difference as a reference after endurance. That is, if the value of the variable sensitivity of the sensor S was equal to or lower than the given target value, the sample was evaluated as good (G) however in a case were the above value (reference value) was not met, the evaluation was not passed (Fail). Results are shown in Table 1.

TABLE 1

| | CL POR % | CL THK μm | C LOAD RATIO % | AVE. PAR DIAM μm | PL THK μm | PL POR % | RESP | NOx SEN |
|---|---|---|---|---|---|---|---|---|
| 1 | 10 | 20 | 2 | 0.5 | 100 | 5 | F | G |
| 2 | 20 | 20 | 2 | 0.5 | 100 | 5 | G | G |
| 3 | 40 | 20 | 2 | 0.5 | 100 | 5 | G | G |
| 4 | 60 | 20 | 2 | 0.5 | 100 | 5 | G | G |
| 5 | 70 | 20 | 2 | 0.5 | 100 | 5 | G | F |
| 6 | 40 | 5 | 2 | 0.5 | 100 | 5 | F | F |
| 7 | 40 | 10 | 2 | 0.5 | 100 | 5 | G | G |
| 8 | 40 | 20 | 2 | 0.5 | 100 | 5 | G | G |
| 9 | 40 | 60 | 2 | 0.5 | 100 | 5 | G | G |
| 10 | 40 | 70 | 2 | 0.5 | 100 | 5 | F | G |
| 11 | 40 | 20 | 2 | 0.05 | 100 | 5 | F | F |
| 12 | 40 | 20 | 2 | 0.1 | 100 | 5 | G | G |
| 13 | 40 | 20 | 2 | 0.8 | 100 | 5 | G | G |
| 14 | 40 | 20 | 2 | 0.9 | 100 | 5 | F | F |
| 15 | 40 | 20 | 0.05 | 0.5 | 100 | 5 | F | F |
| 16 | 40 | 20 | 0.1 | 0.5 | 100 | 5 | G | G |
| 17 | 40 | 20 | 3 | 0.5 | 100 | 5 | G | G |
| 18 | 40 | 20 | 4 | 0.5 | 100 | 5 | F | F |
| 19 | 20 | 20 | 2 | 0.5 | 50 | 5 | F | F |
| 20 | 20 | 20 | 2 | 0.5 | 60 | 5 | G | G |
| 21 | 20 | 20 | 2 | 0.5 | 100 | 20 | G | G |
| 22 | 20 | 20 | 2 | 0.5 | 100 | 30 | G | F |

As shown in the results of table 1, desirable results, indicated by G (good) for both the sensor response and the NOx sensitivity were obtained for the gas sensors S of samples 2 to 4, each of which is provided with the catalyst layer 4 having a porosity between 20 to 60%. In contrast, the gas sensor response evaluated to be failed (F) for the gas sensor S of sample 1 which was equipped with a catalyst layer 4 having a porosity of 10%. It was considered that the response of the sensor failed due to a decrease in the dispersing speed of gas in the catalyst layer, causing the response of the sensor to easily decrease. Also, the NOx sensitivity failed for the gas sensor S of sample 5 provided with a porosity of 70%. Since there was a large volume of gas passing through the catalyst layer 4, the adsorption of CO decreased due to aggregation and transpiration, for example, of the Pt particles 42, thus variability of the sensor output occurred easily, as a result.

A desirable result was obtained for both the sensor response and the NOx sensitivity in the gas sensors S of samples 7 to 9, provided with a catalyst layer thickness (CL THK) between 10 um and 60 μm. However, both the sensor response and the NOx sensitivity failed for the gas sensor of sample 6 provided with a catalyst layer thickness of 10 μm. In this case, it was considered that, a sufficient specific area was not obtainable, due the thickness of the layer which was relatively thin.

The sensor response was evaluated as fail (F) for the gas sensor S of sample 10, which has a layer thickness of 70 μm. In this case, it is considered that a decrease in a gas diffusion rate as a result of an excessive thickness of catalyst layer 4 of the gas sensor S was the cause of the failed response.

On the other hand, a desirable result was obtained for both the sensor response and the NOx sensitivity of the gas sensors S of samples 12 and 13. These samples are provided with a catalyst layer 4, having particles with an average particle diameter of a respective 0.1 μm and 0.8 μm. Both the sensor response and the NOx sensitivity of the respective gas sensor S of samples 11 and 14 failed which had an average particle diameter of 0.05 and 0.9 μm, respectively. This is considered to be due to a decrease in the CO adsorption. It is considered that the aggregation of the Pt particles 42 easily progressed as a result of either the Pt particles easily moving or an insufficient distance not being secured between the particles.

A desirable result was obtained for both the sensor response and the NOx sensitivity of the gas sensors S of samples 16 and 17, each of which was provided with a catalyst loading percentage of 0.1 to 3% mass weight on the catalyst layer 4. However, both the sensor response and the NOx sensitivity failed in the gas sensors S of samples 15 and 18, which had a catalyst loading percentage of 0.05% and 4% respectively. It is considered that the CO adsorption was decreased due to either transpiration or aggregation of the Pt particles 42.

A desirable result was obtained for both the sensor response and the NOx sensitivity of the gas sensors S of samples 20 and 21 provided with an electrode protection layer 5 having a thickness of 60 μm or more. However, both the sensor response and NOx sensitivity was evaluated as failed for the gas sensor S of sample 19, which included a protection layer 5 having a layer thickness less than 60 μm. It is considered that exposure of the electrode 2 on the exhaust gas side to high temperature gas caused deterioration thereof, thus the variation characteristic easily occurred. The NOx sensitivity failed for the gas sensor of sample 22 which had the electrode protection layer 5 with a larger porosity than the catalyst layer 4. It is considered that the exhaust gas remaining in the catalyst layer was insufficient, thus decreasing the adsorption of CO.

In this way, by appropriate adjustment of the porosity and thickness of the catalyst layer 4, the catalyst loading percentage, the average particle diameter in addition to the porosity and thickness of the electrode protection layer 5, the sensor response and the NOx sensitivity may be desirably maintained, and the durability of the gas sensor may also be enhanced.

Second Embodiment

In the first embodiment, the gas sensor S equipped with a cup-shaped gas sensor element 1 was described. A ceramic sheet laminated type element may also be used as the gas element 1. The different points between the first embodiment and a second embodiment will be described when the laminate type element 1 is used in the second embodiment. It is note that, symbols used in the second embodiment and embodiments hereafter which are the same as the first embodiment represent a same configuring element unless stated otherwise.

Figure 20:
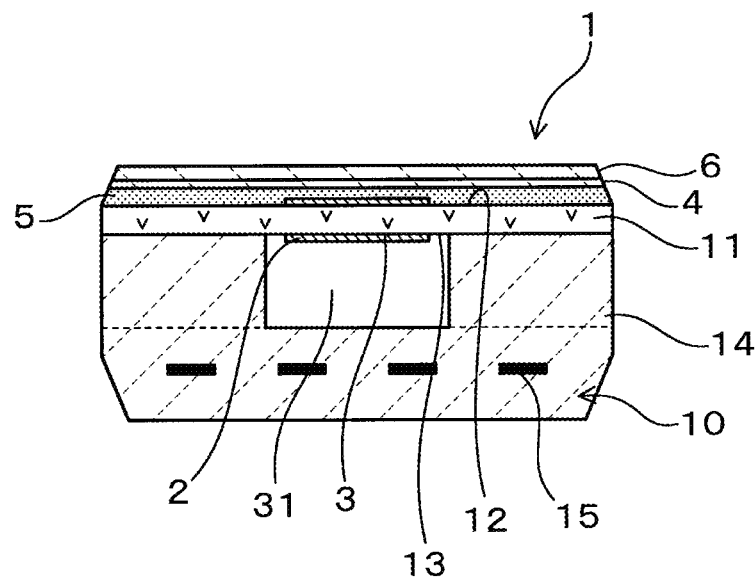
FIG. 20 is a cross sectional view showing an example of the front-end section of the gas sensor element as the main part of the gas sensor in the axial direction according to the second embodiment.

As shown in FIG. 20, the gas sensor element 1 has a sheet-type solid electrolyte body 11. The solid electrolyte body 11 is configured with the measuring gas electrode 2 disposed on the surface 12 of the first side thereof (specifically, an upper surface in the FIG. 20), and the reference gas electrode 3 disposed on the surface 13 of the second side thereof (specifically, lower surface in FIG. 20). The first and second sides are sides onto which the measuring gas electrode 2 and the reference gas electrode are exposed respectively to the measuring gas and the reference gas. The electrode protection layer 5 is disposed to cover the measuring gas electrode 2 and the upper surface 12 of the solid electrolyte body 11. The catalyst layer 4 is formed on a surface of the electrode protection layer 5 and the trap layer 6 covers an outer-surface of the catalyst layer 4.

The measuring gas electrode 2, the reference gas electrode 3, the electrode protection layer 5, the catalyst layer 4 and the trap layer 6 are each configured in the same way as the embodiment 1, thus, a detailed description is omitted. A ceramic base 14, which configures the reference gas chamber 31 is laminated on the lower-side surface of the solid electrolyte body 11, and a heater 10 is configured by the heater electrodes 15 embedded in a lower end of the ceramic base 14.

The gas sensor S configured with the gas sensor element 1 of the second embodiment also has the metal catalyst as the single substance Pt on the ceramic layer 4. The specific surface area of the metal catalyst is configured within a predetermined range to obtain the same effects of the first embodiment.

Third Embodiment

Figure 21:
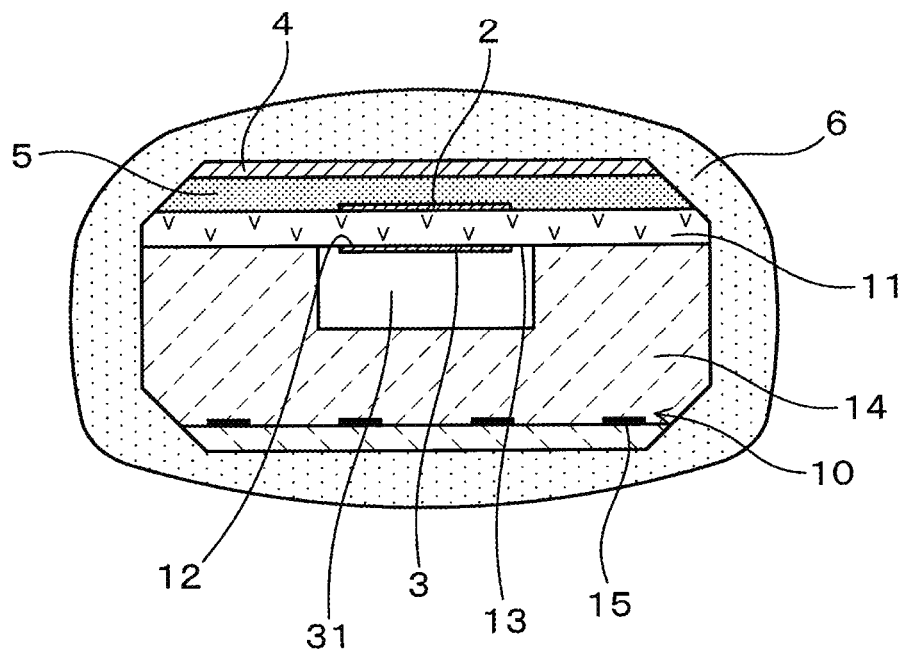
FIG. 21 is a cross sectional view of an example of the front-end section of the gas sensor element as a main part of the gas sensor in the axial direction according to a third embodiment.

As shown in FIG. 21, if the laminate-type sensor element 1 is adapted, an entire outer surface of the gas sensor element 1 may be covered with the trap layer 6 consisting of a porous ceramic layer. Other configuring elements are basically the same as the second embodiment thus a detailed description is omitted. The gas sensor element 1 of the third embodiment also has the metal catalyst as the single substance Pt on the ceramic layer 4. The specific surface area of the metal catalyst is configured within the predetermined range to obtain the same effects of the first embodiment.

The measuring theory using the gas sensor element 1 of the respective second and third embodiments is the same as the first embodiment, that is, by using electromotive force that is generated by the oxygen pressure difference between the measuring gas electrode 2 and the reference gas electrode 3. In this way, the gas sensor S configured with the laminate-type gas sensor element 1 may also prevent the λ point from shifting to the lean state, by providing the catalyst layer 4 having the CO adsorption ability, on the outer side thereof, relative to the measuring gas electrode 2, whereby, a same effect as the gas sensor element 1 of other embodiments described hereinabove may be obtained. That is, the ratio of NO/CO which reaches the exhaust gas electrode 2 is increased, thus, the shifting to the lean state may be suppressed.

Fourth Embodiment

Figure 22:
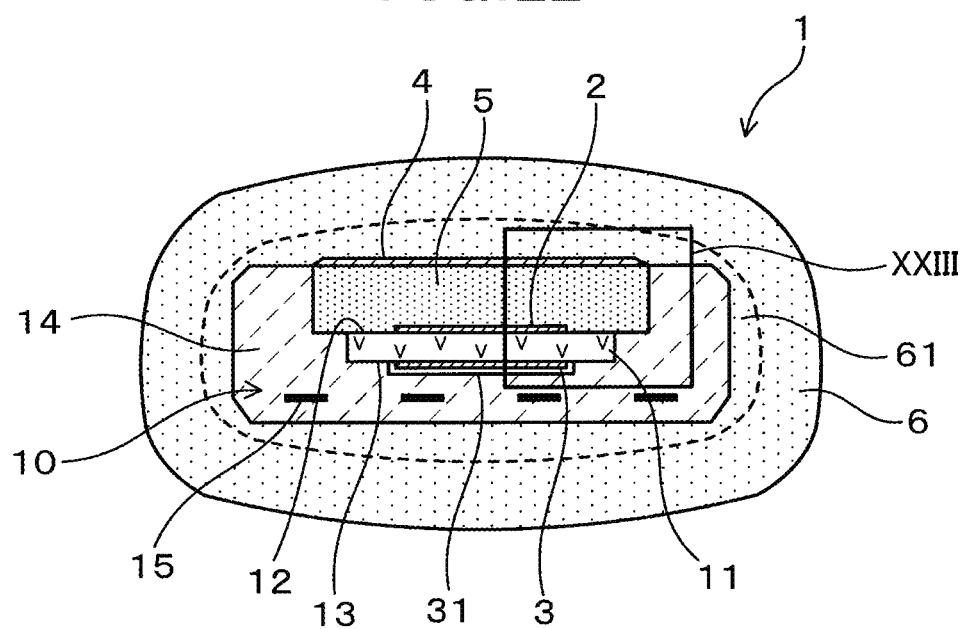
FIG. 22 is a cross section view of an example of the front-end section of the gas sensor element as the main part of the gas sensor in the axial direction according to a fourth embodiment.
Figure 23:
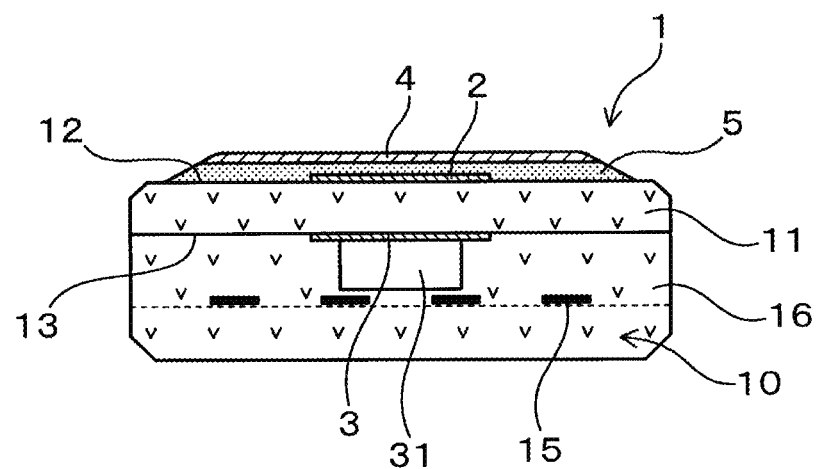
FIG. 23 is an enlarged cross section view of section of the front-end section of the gas sensor element, an enlarged view across a region XXIII of FIG. 22 according to the fourth embodiment.

As shown in FIGS. 22 and 23, an electrode which forms the solid electrolyte body 11 may be disposed to be embedded inside the ceramic base 14 which configures the reference gas chamber 31, for the laminate type gas sensor element 1. In the fourth embodiment, the gas sensor element 1 is provided with the sheet formed solid electrolyte body 11 which is accommodated inside a space member provided in the ceramic base 14 and the electrode protection layer 5 forming a layer which fills the space member of the ceramic base 14. The measuring gas electrode 2 is disposed on the surface side 12 (specifically, upper surface in the figure) of the solid electrolyte body 11 and the reference gas electrode 13 is disposed on the surface side 13 (specifically, the lower surface in the figure) of the solid electrolyte body 11. The surface side 12 is provided for the measuring gas and the surface side 13 is provided for the reference gas. The reference gas electrode 3 opposes the reference gas chamber 31 which is configured inside the space member of the ceramic base 14.

The catalyst layer 4 is formed on the surface of the electrode protection layer 5. The heating electrodes 15 and the heater 10 configured in the ceramic basic base 14 are disposed to oppose a side of the electrode protection layer 5 (specifically, the lower side surface in the figure). A coating layer 61 covers the outer surface of the catalyst layer 4 and the ceramic base 14, and the trap layer 6 is disposed to cover an entire outer-surface thereof. The configuration of the catalyst layer 4 and the electrode protection layer 5 is the same as the embodiments described above. The coating layer 61 is a porous ceramic layer formed from alumina, for example, however the coating layer 61 may also be omitted.

The gas sensor S equipped with the gas sensor element 1 of the fourth embodiment is also provided with the metal catalyst Pt as the single substance on the catalyst layer 4, and the specific surface area of the metal catalyst is configured within the predetermined range to obtain the same effects of the first embodiment.

Fifth Embodiment

Figure 24:
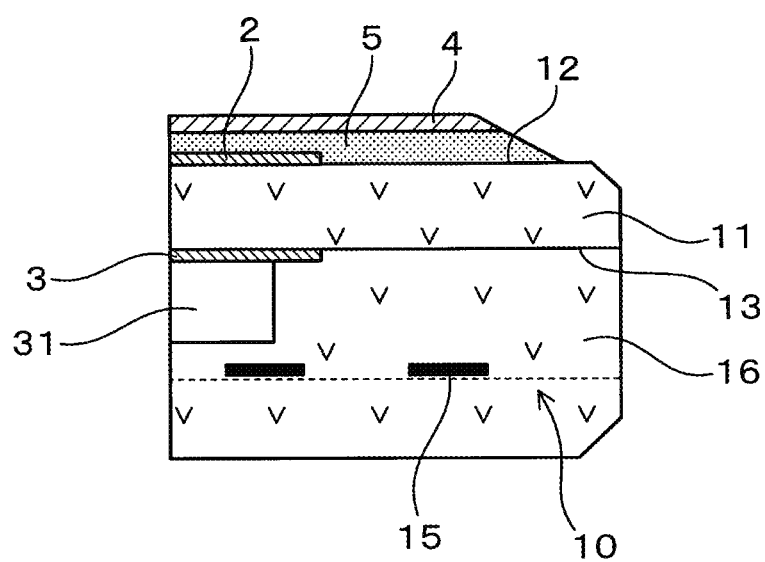
FIG. 24 is a cross section view of an exemplified configuration of the front-end section of the gas sensor element as the main part of the gas sensor in the axial direction according to a fifth embodiment.
Figure 25:
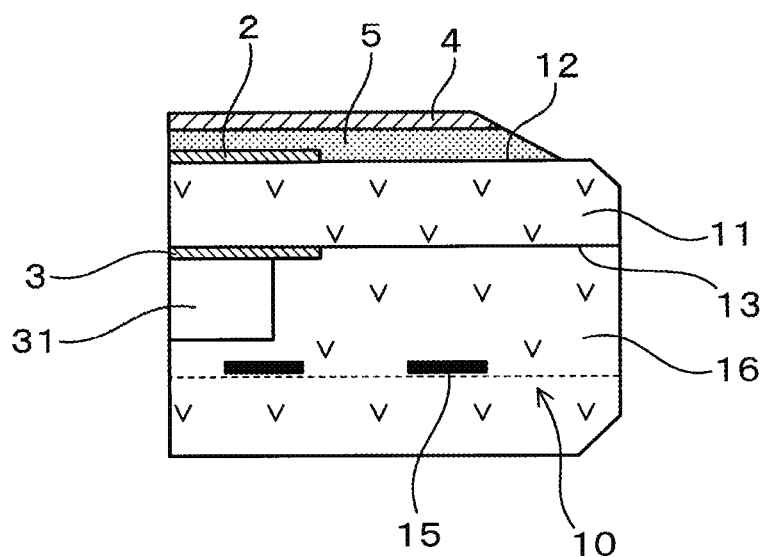
FIG. 25 is an enlarged cross sectional view of a part of the front-end section of the gas sensor element according to the fifth embodiment.

The laminate type gas sensor element 1 may be equipped with the reference gas chamber 31 and heater 10 forming a ceramic base at a solid electrolyte body 16, as shown in FIGS. 24 and 25. In the fifth embodiment, the gas sensor element 1 has the solid electrolyte body 16 which is formed from a zirconia type material in the same manner as the solid electrolyte body 11. The reference gas chamber 31 is formed in a space member provided in the solid electrolyte body 16. The measuring gas electrode 2 is disposed on the surface 12 (specifically, upper surface in the figure) of the solid electrolyte body 11, and the reference gas electrode 3 is disposed on the surface 13 (specifically, lower surface in the figure). The surface 12 and the surface 13 are each provided on the respective side for the measuring gas and the reference gas. The reference gas electrode 3 faces the reference gas chamber 31 by configuring the laminating the solid electrolyte body 16 on the solid electrolyte body 11.

The electrode protection layer 5 is formed to cover the measuring gas electrode 2, the surface 12 of the electrolyte body 11, additionally the catalyst layer 4 is formed to cover the surface of the electrode protection layer 5. The heater 15 is embedded in the solid electrolyte body 16, on an opposed side to the electrode protection cover 5 (specifically, the lower side surface in the figure) to form the heater 10. The catalyst layer 4 and the electrode protection layer 5 are configured in the same way as was previously described, and the trap layer 6 may also be formed to cover the catalyst layer 4 as was also described in the previous embodiments.

The gas sensor S equipped with the gas sensor element 1 of the fifth embodiment is also provided with the metal catalyst Pt as a single substance on the catalyst layer 4, and the specific surface area of the metal catalyst is configured within the predetermined range to obtain the same effects of the first embodiment.

The gas sensor element 1 according to the fourth and fifth embodiments employs the same measuring theory as the first to third embodiments, that is, the electromotive force which is generated by the oxygen pressure difference between the measuring gas electrode and the reference gas electrode 3. There is also a gas sensor element 1 which is configured to adjust an oxygen pressure of the reference gas electrode 3, by application of a voltage to the reference gas electrode 3 and pumping oxygen from the measuring gas electrode. Next, this kind of gas sensor element 1 will be described in a sixth embodiment.

Sixth Embodiment

Figure 26:
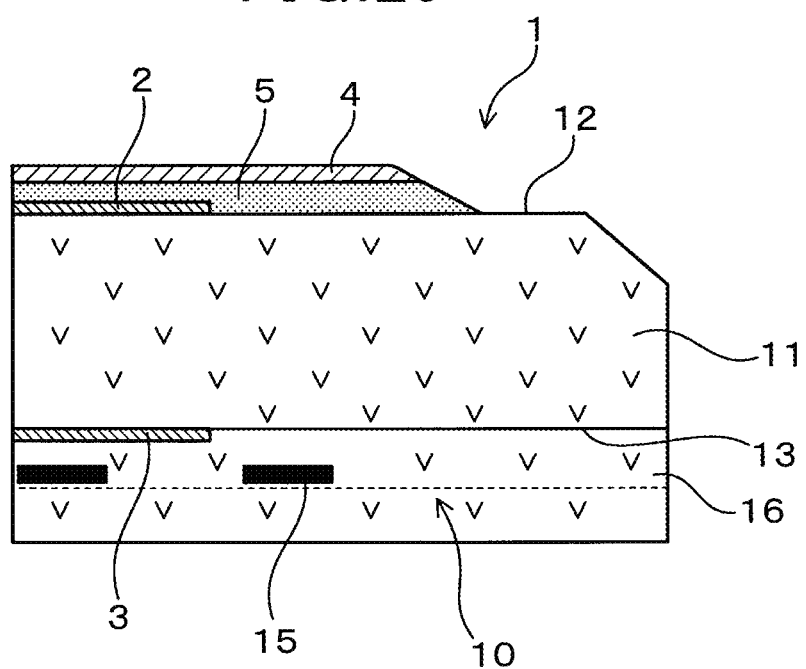
FIG. 26 is an enlarged cross sectional view of a part of the front-end section of the gas sensor element as the main part of the sensor according to a sixth embodiment.

As shown in FIG. 26, the laminate-type gas sensor element 1 may also be configured without the reference gas chamber 31. In the present embodiment, the gas sensor element 1 is configured from the solid electrolyte body 11 laminated on the solid electrolyte body 16. The solid electrolyte body 11 has the measuring gas electrode 2 disposed on the surface 12 provided on the first side for the measuring gas (specifically, the upper surface in the figure) and the reference gas electrode 3 (specifically, the lower surface in the figure) disposed on the surface 13 on the second side for the reference gas. The solid electrolyte body 16 which forms the ceramic base is laminated onto a lower surface of the solid electrolyte body 16, and the heaters 15 are embedded inside the solid electrolyte body 16 to configure the heater 10.

The electrode protection layer 5 is formed to cover the measuring gas electrode 2 on the first side of the solid electrolyte body 11. The catalyst layer 4 is disposed to cover the surface of the electrode protection layer 5. The catalyst layer 4 and the electrode protection layer 5 are configured in the same manner described for the other embodiments described and the trap layer 6 may also be formed to cover the catalyst layer 4 as was also described in the previous embodiments.

The gas sensor S equipped with the gas sensor element 1 of the sixth embodiment is also provided with the metal catalyst Pt as the single substance on the catalyst layer 4, and the specific surface area of the metal catalyst is configured within the predetermined range to obtain the same effects of the first embodiment.

However, the gas sensor element according to the sixth embodiment has a different mechanism for generating the electromotive force, than the other embodiments described herein above. That is, when the oxygen pressure of the reference gas electrode is obtained by applying the voltage to the reference gas electrode pumping oxygen from the side of measuring gas, the output voltage is a total of the electromotive force between the measuring gas electrode 2 and the reference gas electrode 3 and the pumping voltage. In this way, the same shift at the $\lambda$ point occurs for the gas sensor 1 which employs the measuring theory described above.

The gas sensor element 1 according to any one of the embodiments 4 to 6, has the shift occurring at the $\lambda$ point, therefore, by configuring the catalyst layer 4 on the outerside relative to the measuring gas electrode 2, the same effects as the first embodiment may be obtained. That is, the lean shift in the λ point may be suppressed by increasing the NO/CO ratio which reaches the exhaust gas electrode 2 of the gas sensor S.

The present disclosure is not limited to the above described embodiments, that is, various modifications thereof may be adopted without departing from the scope of claims. For example, in each of the embodiments, a gas sensor S configured on a downstream side of the catalyst for the exhaust gas purification system of an engine for a vehicle is exemplified, however, not limited to this configuration. That is, a gas sensor S may be disposed upstream of the catalyst. Furthermore, the catalyst is not limited to a three-way catalyst, and other catalysts or particulate matter filters may also be used.

Additionally, the configuration of the gas sensor S is not limited to the above described embodiments, the element cover and other configuring elements may be appropriately modified. The gas sensor may be adapted to an internal combustion engine other than a vehicle.

SYMBOLS

1 . . . gas sensor element
11 solid electrolyte body
12 measuring gas side surface
13 reference gas side
2 measuring gas electrode
3 reference gas electrode
4 catalyst layer
5 electrode protection layer

What is claimed is:

1. A gas sensor comprising:
    a gas sensor element detecting a concentration of a specific gas contained in a measuring gas;
    the gas sensor element provided with
        a solid electrolyte body having oxide ion conductivity, the solid electrolyte body having a first surface and a second surface;
        a measuring gas electrode disposed on the first surface of the solid electrolyte body, void areas being formed in the measuring gas electrode, the measuring gas electrode being exposed to the measuring gas;
        a reference gas electrode disposed on the second surface of the solid electrolyte body, and being exposed to reference gas;
        a catalyst layer containing a metal catalyst which is loaded onto a carrier; the catalyst layer having gas permeability and being configured, on an outer surface of the measuring gas electrode;
        an electrode protection layer disposed between the catalyst layer and the measuring gas electrode; and
        a trap layer, configured to trap exhaust gas serving as the measuring gas, which is arranged on an outer-surface of the catalyst layer, the trap layer configuring an outmost layer of the gas sensor element;
    wherein the metal catalyst is provided as a single substance consisting of platinum,
    the catalyst layer is provided an assembly of catalyst particles (CP) being formed of the metal catalyst platinum,
    the catalyst particles having an average particle diameter in a range of 0.1 μm to 0.8 μm, and
    a specific surface area of the metal catalyst is 0.01 or more and 23 or less, and the specific surface area is expressed in an equation as TC/TA:
    wherein TC denotes as a total surface area of the metal catalyst existing on top of a surface area of the measuring gas electrode, and TA denotes an actual surface area of the measuring gas electrode, the actual surface area of the measuring gas electrode being defined as a total surface area of the measuring gas electrode with the void areas subtracted therefrom, the void areas existing along and in the surface of the measuring gas electrode.

2. The gas sensor according to claim 1, wherein the assembly of catalyst particles are loaded onto particle carriers, and a loaded ratio of the metal catalyst is in a range of 0.1 to 3% mass weight.

3. The gas sensor according to claim 1, wherein the catalyst layer has a layer thickness in a range of 10 μm to 60 μm and a porosity in a range of 20% to 60%.

4. The gas sensor according to claim 1, wherein the electrode protection layer has a layer thickness which is equal to or greater than 60 μm, and a porosity which is equal to or less than the porosity of the catalyst layer.

5. The gas sensor according to claim 2, wherein the catalyst layer has a layer thickness in a range of 10 μm to 60 μm and a porosity in a range of 20% to 60%.

6. The gas sensor according to claim 1, wherein the catalyst layer is configured to, adsorb CO and NO components contained in the measuring gas, whereby the catalyst layer adsorbs higher quantity of the CO component than the NO component, and permeates the CO and NO components contained in the measuring gas through the catalyst layer to reach the measuring gas electrode, wherein higher quantity of the NO component permeates through the catalyst layer to reach the measuring gas electrode than the CO component.

7. The gas sensor according to claim 1, wherein the electrode protection layer is a porous ceramic layer consisting of either one of an oxide compound or an oxide which contains magnesium (Mg), aluminum (Al) and thallium (Tl).

* * * * *